US012613155B2

(12) United States Patent
Fröhlich et al.

(10) Patent No.: US 12,613,155 B2
(45) Date of Patent: Apr. 28, 2026

(54) TORQUE SENSOR DEVICE, FLUX GUIDE ASSEMBLY, AND FLUX GUIDE

(71) Applicant: Valeo Schalter und Sensoren GmbH, Bietigheim-Bissingen (DE)

(72) Inventors: Ekkehart Fröhlich, Bietigheim-Bissingen (DE); Jens Thom, Bietigheim-Bissingen (DE); Sageesh Pachakkil, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 407 days.

(21) Appl. No.: 18/023,501

(22) PCT Filed: Aug. 2, 2021

(86) PCT No.: PCT/EP2021/071547
§ 371 (c)(1),
(2) Date: Feb. 27, 2023

(87) PCT Pub. No.: WO2022/043007
PCT Pub. Date: Mar. 3, 2022

(65) Prior Publication Data
US 2023/0314250 A1 Oct. 5, 2023

(30) Foreign Application Priority Data
Aug. 26, 2020 (EP) ..................................... 20192858

(51) Int. Cl.
*G01L 5/22* (2006.01)
*B62D 6/10* (2006.01)
(Continued)

(52) U.S. Cl.
CPC ................ *G01L 5/221* (2013.01); *B62D 6/10* (2013.01); *B62D 15/0215* (2013.01); *G01L 5/169* (2020.01)

(58) Field of Classification Search
CPC ......... G01L 5/221; G01L 5/169; G01L 3/104; B62D 6/10; B62D 15/0215
See application file for complete search history.

(56) References Cited

U.S. PATENT DOCUMENTS

| 7,644,635 B2 * | 1/2010 | Prudham | ................. G01L 3/104 |
| | | | 73/862.331 |
| 9,347,843 B2 * | 5/2016 | Franz | ...................... G01L 5/221 |

(Continued)

FOREIGN PATENT DOCUMENTS

| CN | 103196607 A | 7/2013 |
| CN | 107110664 A | 8/2017 |

(Continued)

OTHER PUBLICATIONS

P. Leroy et al: "high magnetic field amplification for improving the sensitivity of Hall sensors", IEEE Sensors Journal., Bd. 6, Nr. 3, Jun. 1, 2006 (Jun. 1, 2006), Seiten 707-713, XP055771875, US ISSN: 1530-437X, DOI: 10.1109/JSEN.2006.874031 abbildung 4 (7 pages).

(Continued)

*Primary Examiner* — Octavia Hollington
(74) *Attorney, Agent, or Firm* — Osha Bergman Watanabe & Burton LLP

(57) ABSTRACT

A torque sensor device for detecting a torque applied to a shaft is disclosed. The torque sensor device has a magnetic arrangement, a stator arrangement and a flux guide arrangement, wherein the flux guide arrangement has a first flux guide and a second flux guide, and the first flux guide and the second flux guide each have a first collection surface and each have at least one transmission surface. The second flux (Continued)

Figures 1, 2:
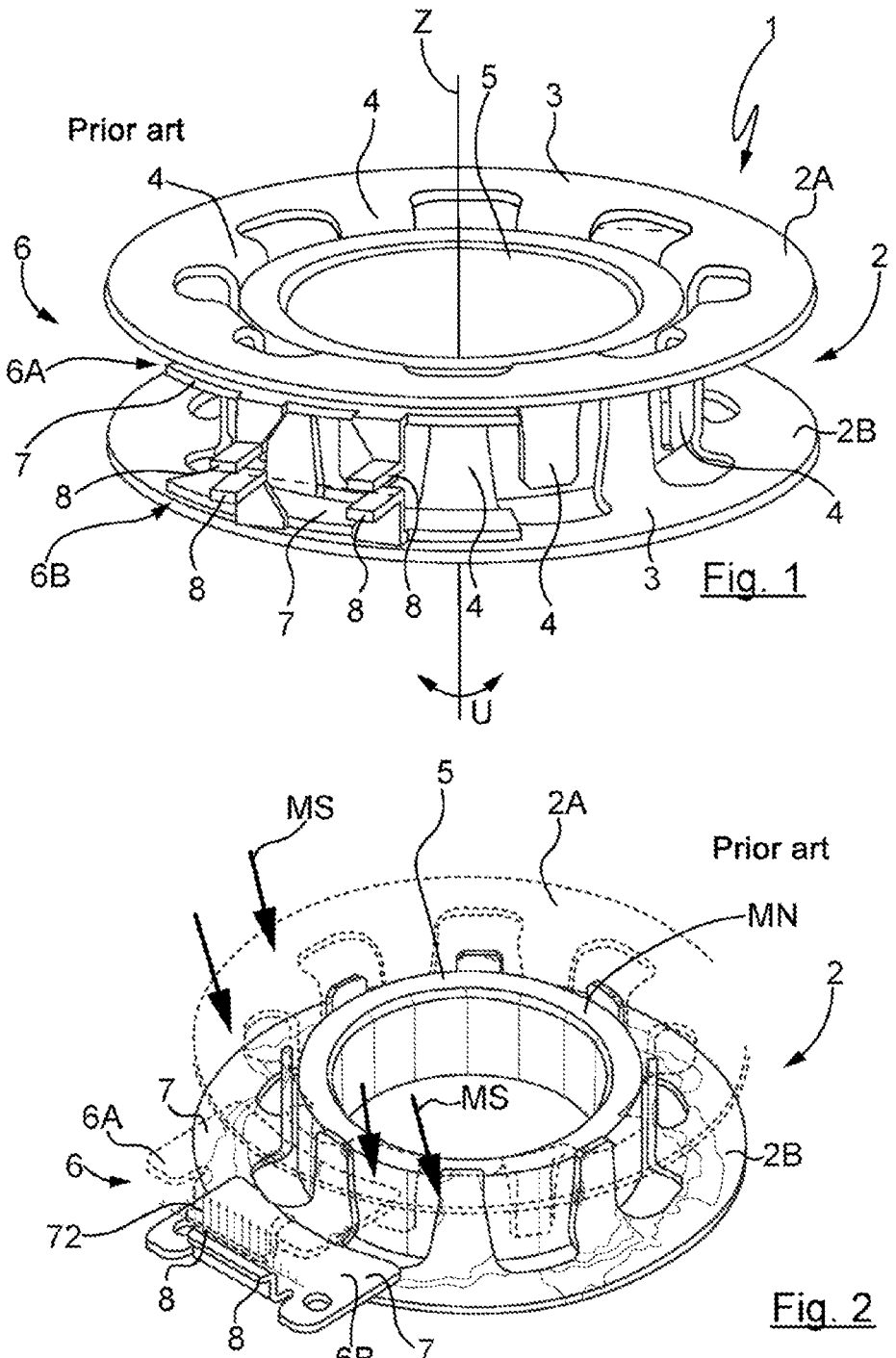

guide has a second collection surface which is magnetically conductively coupled to the at least one transmission surface of the second flux guide. The first flux guide and the second flux guide are arranged relative to one another such that, if the torque sensor device is surrounded by a magnetic interference field, a first interference flux component a second interference flux component at least partially cancel one another out.

14 Claims, 11 Drawing Sheets

(51) Int. Cl.
B62D 15/02 (2006.01)
G01L 5/169 (2020.01)

(56) References Cited

U.S. PATENT DOCUMENTS

| | | | | |
|---|---|---|---|---|
| 9,821,846 | B2 * | 11/2017 | Schoepe | G01D 5/14 |
| 10,712,217 | B2 * | 7/2020 | Berner | B62D 15/0215 |
| 11,385,077 | B2 * | 7/2022 | Lee | B62D 6/10 |
| 11,860,053 | B2 * | 1/2024 | Fröhlich | G01L 3/104 |
| 12,228,468 | B2 * | 2/2025 | Frachon | B62D 15/0245 |
| 2004/0066185 | A1 | 4/2004 | Csikos | |
| 2010/0084215 | A1 | 4/2010 | Sakatani et al. | |
| 2016/0091574 | A1 | 3/2016 | Xu et al. | |
| 2016/0379754 | A1 * | 12/2016 | Rachui | C21D 3/04 |
| | | | | 73/862.333 |

FOREIGN PATENT DOCUMENTS

| | | | | | |
|---|---|---|---|---|---|
| CN | 108444628 | A | | 8/2018 | |
| DE | 102007057050 | A1 | | 7/2008 | |
| DE | 102012014208 | A1 | | 5/2014 | |
| DE | 102013006379 | A1 | | 10/2014 | |
| DE | 102018112930 | A1 | | 12/2019 | |
| EP | 1269133 | B1 | | 5/2004 | |
| EP | 2072985 | A1 | | 6/2009 | |
| EP | 3931065 | A1 | | 1/2022 | |
| EP | 3931065 | B1 | * | 4/2024 | B62D 6/10 |
| KR | 20240019368 | A | * | 2/2024 | |
| WO | WO-2012015183 | A2 | * | 2/2012 | B62D 15/0215 |
| WO | 2014/012893 | A2 | | 1/2014 | |
| WO | 2020-035262 | A1 | | 2/2020 | |
| WO | 2020174170 | A1 | | 9/2020 | |

OTHER PUBLICATIONS

International Search Report and Written Opinion in corresponding International Application No. PCT/EP2021/071547, dated Nov. 19, 2021 (16 pages).

Communication from examing division in corresponding EP application No. 20 192 858.7, Dated Mar. 31, 2023 (8 pages).

Office Action issued in counterpart Chinese Patent Application No. 202180022135.6 mailed Mar. 22, 2025 (24 pages).

Office Action issued by the Chinese Patent Office for corresponding Chinese Patent Application No. 2021800221356, mailed Sep. 25, 2025 (12 pages).

* cited by examiner

Prior art

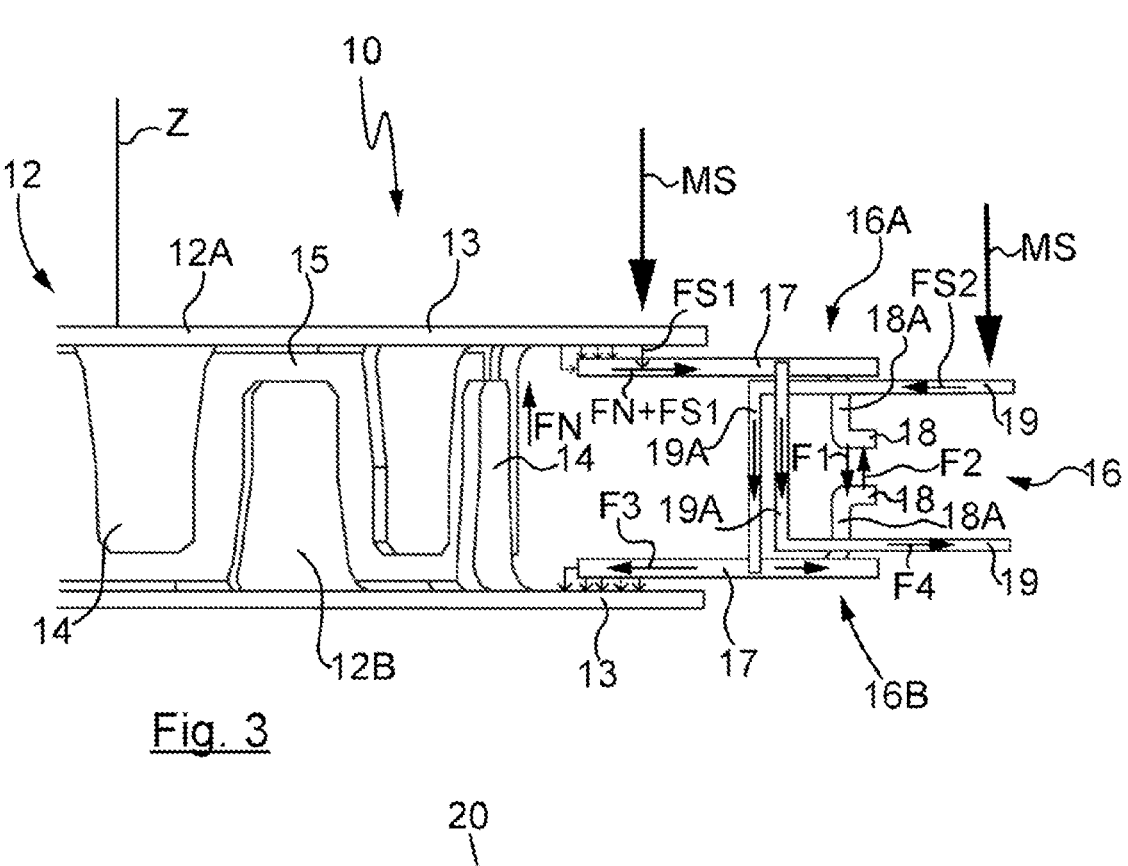
_Fig. 3_
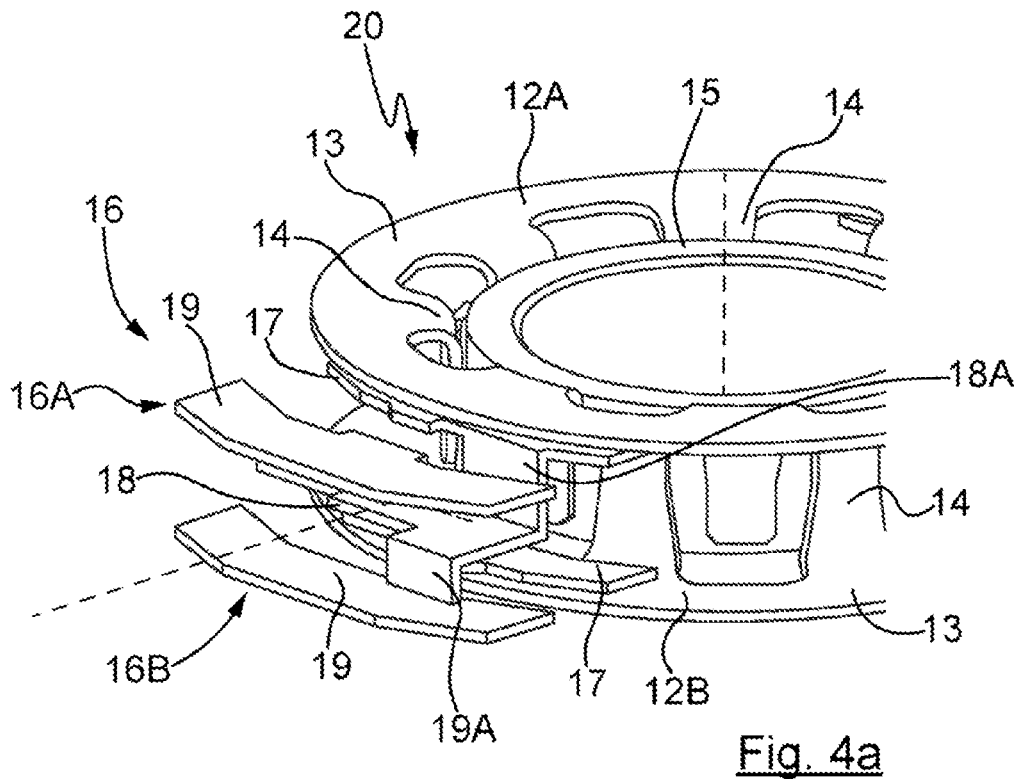
_Fig. 4a_

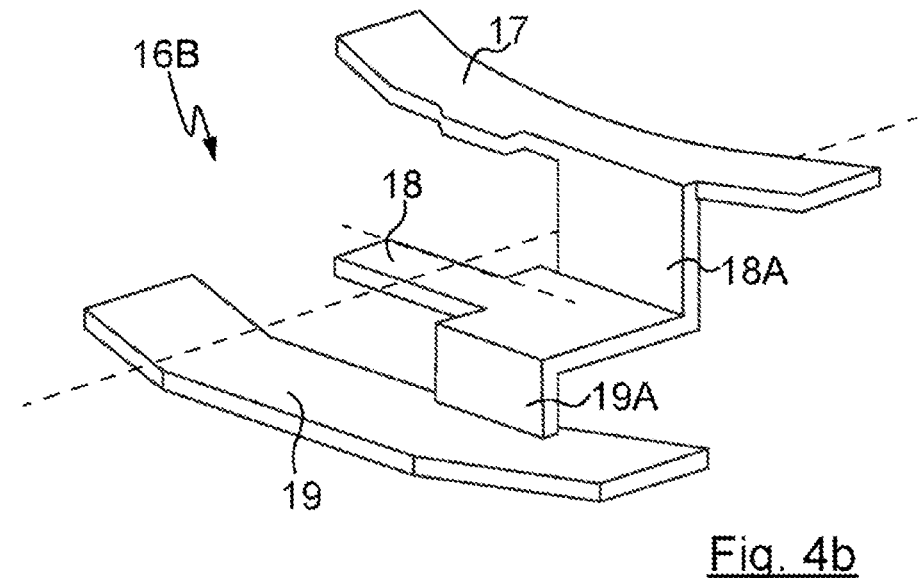
_Fig. 4b_
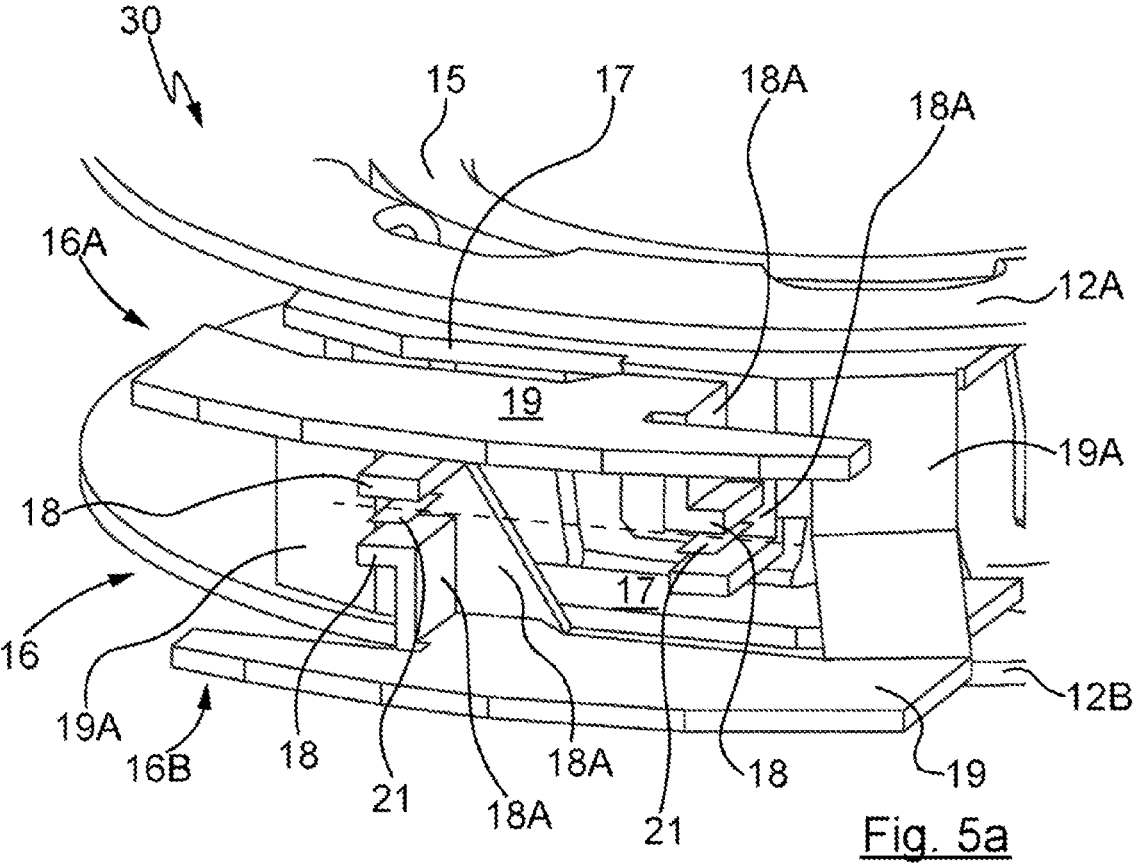
_Fig. 5a_

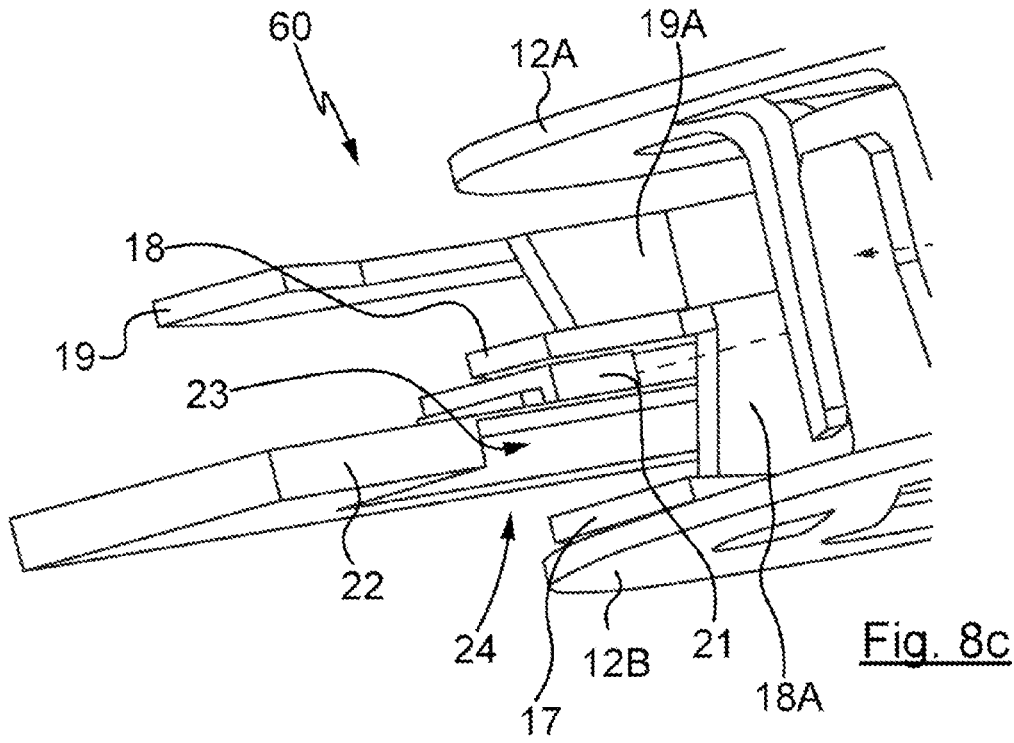
_Fig. 8c_
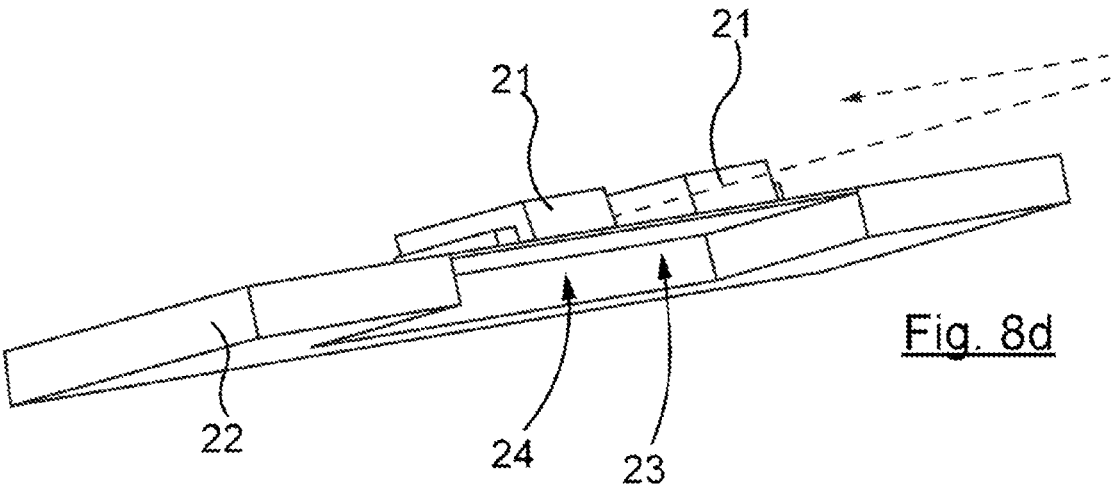
_Fig. 8d_

TORQUE SENSOR DEVICE, FLUX GUIDE ASSEMBLY, AND FLUX GUIDE

The invention relates to a torque sensor device for detecting a torque applied to a shaft, in particular for detecting a torque applied to a steering shaft of a motor vehicle, wherein the torque sensor device has a magnetic arrangement, a stator arrangement and a flux guide arrangement.

The invention furthermore relates to a flux guide arrangement for a torque sensor device.

The invention furthermore relates to a flux guide for a torque sensor arrangement and/or for a flux guide arrangement for a torque sensor device.

Torque sensor devices of the generic type, in particular for steering shafts of motor vehicles, are basically known from the prior art, for example from DE 10 2013 006 379 A1 or EP 1 269 133 B1.

Torque sensor devices of this type are used, for example, in electrical steering systems in order to activate the electrical driving motor of the steering system on the basis of a steering torque applied by a driver, for example in order to provide corresponding steering assistance.

Generally, for this purpose, torque sensor devices are used in conjunction with an axially divided shaft and with a torsion bar of defined, known torsional rigidity, wherein the torsion bar connects a first part of the axially divided shaft to a second part of the axially divided shaft.

If a torque is applied to the shaft, this causes twisting of the two parts of the shaft with respect to each other by a measurable angle of twist, wherein the angle of twist arises in a manner dependent on the applied torque and the rigidity of the torsion bar, and therefore the applied torque can be determined from the detected angle of twist if the rigidity of the torsion bar is defined and known.

Various measuring principles and sensor arrangements are known for measuring the angle of twist resulting from an applied torque, wherein use is very frequently made of magnetic sensor devices or systems in which a magnetic arrangement having at least one magnetic element, generally having an encircling ring magnet in the form of a permanent magnet, is connected to the first part of the steering shaft for rotation therewith, and a stator arrangement having one or more magnetically conductive stators is connected to the second part of the shaft for rotation therewith, wherein the stator arrangement is generally arranged in the radial direction concentrically about the magnetic arrangement, in particular the magnetic element, with a small air gap in between. The magnetic flux of a magnetic field generated by means of the magnetic arrangement can be conducted via the stator arrangement, which conventionally comprises two separate stators having in each case a region in the shape of an annular disk, to a magnetic sensor arrangement having at least one magnetic sensor, for example a Hall sensor, and evaluated.

If the magnetic arrangement connected to the first part of the shaft for rotation therewith, in particular the magnetic element of said magnetic arrangement, is moved by a rotational movement of the shaft relative to the stator arrangement connected to the second part of the shaft, the magnetic flux density in the stator arrangement, in particular in the individual stators, changes, which can be detected by means of the magnetic sensor arrangement. The change in the magnetic flux density in the stator arrangement is dependent here, inter alia, on the size of the relative movement of the magnetic arrangement, in particular of the respective magnetic elements, in relation to the stator arrangement, in particular in relation to the individual stators, that is to say on the angle of twist. A conclusion can thus be drawn regarding the angle of twist from the change in the detected flux density and, from the angle of twist in turn, with knowledge of the torsional rigidity of the torsion bar, the torque applied to the shaft can be determined.

Superimposition of the magnetic field generated by the magnetic arrangement of the torque sensor device with a further magnetic field, which for the magnetic field of the sensor device constitutes a magnetic interference field, for example with a magnetic field of a further sensor device or with a magnetic field which is present in the surroundings of the torque sensor device, for example with a magnetic field of an electrical machine located in the vicinity, for example the magnetic field of an electric motor or generator, or of high-current lines, can cause undesired influencing of the flux transmitted to the magnetic sensor device and in particular to a change, caused by the further magnetic field, in the transmitted flux density, leading to a sensor signal which is erroneous but plausible and which is therefore not recognized as being incorrect, consequently leading to an erroneous torque value.

Various measures are known from the prior art for reducing the sensitivity of above-described torque sensor devices of the generic type to interference.

In order to compensate for interference caused by a magnetic field of a further sensor device, what is referred to as "crosstalk", US 2016/0091574 A1 proposes, for example, providing at least one additional magnetic element, which is arranged symmetrically with respect to the magnetic element of the further sensor device, in order to compensate for the influence of the magnetic field of the magnetic element of the further sensor device on the actual sensor device. This however requires, in particular, knowledge of the direction of the interfering magnetic field.

WO 2020/035262 A1 has disclosed, for example, a torque sensor device for detecting a torque applied to a shaft, which torque sensor device has a stator arrangement, a magnetic arrangement and a magnetic sensor arrangement, wherein the magnetic arrangement and the stator arrangement are configured and arranged relative to each other in such a manner that, by means of a relative movement between the magnetic arrangement and the stator arrangement in a circumferential direction, a first magnetic flux with a first magnetic flux direction and a second magnetic flux with a second flux direction opposite to the first flux direction can be generated, wherein the magnetic sensor arrangement comprises a first magnetic sensor for detecting the first magnetic flux and a second magnetic sensor for detecting the second magnetic flux.

DE 10 2007 057 050 A1 discloses a sensor arrangement, with relatively low susceptibility to interference, for measuring a torque acting on a shaft, wherein the shaft has a first shaft portion and a second shaft portion and said two shaft portions can be twisted relative to one another, with at least one magnetic encoder arranged on the first shaft portion and one stator arranged on the second shaft portion, wherein the stator has two stator elements that each have projecting fingers, wherein at least one additional, second sensor is arranged on the second shaft portion, which additional, second sensor likewise has two stator elements that each have projecting fingers, and said stators are assigned to the magnetic encoder.

Furthermore, DE 10 2018 112 930 A1 has disclosed a determining device for determining a steering torque of a steering device of a vehicle, which steering device has a steering shaft with a first shaft portion and with a second shaft portion which is arranged coaxially downstream of the first shaft portion and which is twistably mechanically operatively connected to the first shaft portion, wherein the determining device furthermore has a magnetic element for generating a magnetic field and has a magnetic field receiving element for conducting magnetic field lines of the magnetic field away from and to the magnetic element, wherein, furthermore, the magnetic element is arranged on the first shaft portion for rotation therewith and the magnetic field receiving element is arranged on the second shaft portion for rotation therewith, wherein the determining device has at least one magnetic guide element which, to form an at least partially closed magnetic field circuit with a magnetic field flux direction, is magnetically communicatively connected to the magnetic receiving element via a first magnetic flux connection and a second magnetic flux connection, wherein a first magnetic sensor is arranged in the first magnetic flux connection and a second magnetic sensor is arranged in the second magnetic flux connection, and wherein the magnetic field flux direction through the first magnetic sensor in the first magnetic flux connection differs from the magnetic field flux direction of the second magnetic sensor in the second magnetic flux connection.

Against this background, it is an object of the invention to provide an alternative, in particular improved, torque sensor device, in particular a torque sensor device where the influence of at least one external magnetic interference field, which is present in the surroundings of the torque sensor device, on a torque value that is to be determined is reduced. It is a further object to provide an alternative, in particular improved, flux guide arrangement and an alternative, in particular improved, flux guide, in particular a flux guide arrangement and a flux guide by means of which an influence of at least one external magnetic interference field, which is present in the surroundings of the torque sensor device, on a torque value to be determined can be reduced.

This object is achieved by a torque sensor device according to the invention, by a flux guide arrangement according to the invention and by a flux guide according to the invention having the features according to the respective independent patent claims. Advantageous embodiments of the invention are the subject matter of the dependent patent claims, the description and the figures, and will be explained in more detail below.

A torque sensor device according to the invention for detecting a torque applied to a shaft, in particular for detecting a torque applied to a steering shaft of a motor vehicle, has a magnetic arrangement, a stator arrangement and a flux guide arrangement, wherein the magnetic arrangement is configured to generate at least one magnetic working field, and the magnetic arrangement and the stator arrangement are movable relative to one another in a circumferential direction about a central axis of the torque sensor device as a result of a torque being applied, in such a way that the relative movement between the magnetic arrangement and the stator arrangement in a circumferential direction enables a magnetic working flux to be generated in the stator arrangement in a manner dependent on the torque applied to the torque sensor device. Furthermore, a first magnetic interference flux can be generated in the stator arrangement in a manner dependent on a magnetic interference field surrounding the torque sensor device.

Here, the flux guide arrangement is in particular configured to at least partially concentrate and to conduct, and preferably also to amplify, a magnetic flux, in particular the magnetic flux that is generated in the stator arrangement, to a torque sensor arrangement, wherein the flux guide arrangement has a first flux guide and a second flux guide, wherein the first flux guide and the second each have a first collection surface and each have at least one transmission surface, wherein the first collection surfaces are each configured to at least partially concentrate and/or to at least partially conduct a magnetic working flux, which is generated in the stator arrangement in a manner dependent on an applied torque, and/or a first magnetic interference flux, which is generated in a manner dependent on a magnetic interference field surrounding the torque sensor device.

The at least one transmission surface of the first flux guide and the at least one transmission surface of the second flux guide are arranged opposite one another so as to between them form an axial gap in which at least one magnetic sensor of a magnetic sensor arrangement can be arranged, wherein a first magnetic flux that is in the first flux guide can be transmitted via the at least one transmission surface of the first flux guide to a magnetic sensor, arranged in the axial gap, of a magnetic sensor arrangement, wherein the first magnetic flux may in particular comprise a working flux component and/or a first interference flux component, and a second magnetic flux that is concentrated in the second flux guide can be transmitted via the at least one transmission surface of the second flux guide to the magnetic sensor.

The torque sensor device according to the invention is characterized in that the second flux guide furthermore has a second collection surface which is magnetically conductively coupled to the at least one transmission surface of the second flux guide and which is configured to generate and/or to at least partially concentrate and conduct a second magnetic interference flux in a manner dependent on a magnetic interference field surrounding the torque sensor device, wherein the first flux guide and the second flux guide are each configured and arranged relative to one another such that, if the torque sensor device is surrounded by a magnetic interference field, a first interference flux component of the first magnetic flux, which component is at least partially concentrated in the first collection surface of the first flux guide and transmitted via the at least one transmission surface of the first flux guide to the magnetic sensor, and a second interference flux component of the second magnetic flux, which component is at least partially concentrated in the second collection surface of the second flux guide and transmitted via the at least one transmission surface of the second flux guide to the magnetic sensor, at least partially cancel one another out, in particular in the gap formed by the transmission surfaces.

By means of such a flux guide arrangement with at least one flux guide with two collection surfaces, a magnetic flux which is generated by a magnetic interference field and concentrated in the flux guide arrangement, and which leads or would lead to undesired influencing or falsification of a torque sensor signal generated by the torque sensor device, can in each case be reduced or, in the case of a corresponding design of the flux guide arrangement and in the presence a correspondingly configured external magnetic interference field, that is to say if a magnetic interference field that is correspondingly configured in particular in terms of its direction surrounds the torque sensor device, can even be eliminated entirely. This is even the case in particular in the absence of a second, imperatively required magnetic sensor and/or a second magnetic element and/or in the absence of an additional sensor as has been proposed above, for example, in the above solutions from the that are mentioned by way of example.

The present invention rather makes it possible, simply by means of the two flux guides alone, to reduce and in some cases even completely compensate a (first) magnetic interference flux that is generated by an external magnetic interference field and concentrated in the flux guide arrangement. Here, the reduction and/or compensation of said (first) interference flux can be achieved in particular by means of an advantageous design of the two flux guides in conjunction with an advantageous arrangement of the two flux guides relative to one another, in particular by way of the situation and orientation of the collection surface(s) and/or transmission surfaces of the two flux guides within each flux guide relative to one another and by way of the design, situation and orientation of the two flux guides relative to one another, wherein, by means of the situation and/or orientation of the collection surfaces and/or transmission surfaces of the two flux guides, it is possible in particular to influence the direction of an interference flux component which is generated by the magnetic interference field and concentrated by the flux guides and which is transmitted via the transmission surfaces.

In particular, by means of an advantageous arrangement of the two collection surfaces and of the transmission surface of the second flux guide relative to the at least one transmission surface and the collection surface of the first flux guide, it is possible, in particular in conjunction with advantageous coordination of the sizes of the collection surfaces, to reduce and in some cases even completely compensate an interference flux component generated by a surrounding magnetic interference field.

The present invention thus makes it possible to provide a torque sensor device which is of particularly simple construction and which is therefore inexpensive and robust, in particular to provide a simple and inexpensive torque sensor device that is robust with respect to external magnetic stray fields present magnetic interference fields in the surroundings of the torque sensor device.

Torque sensor devices for detecting a torque applied to a shaft, in particular for detecting a torque applied to a steering shaft of a motor vehicle, in particular the design and function of said torque sensor devices, are basically known to a person of relevant skill in the art from the prior art. In particular from DE 10 2013 006 379 A1 or EP 1 269 133 B1, to which reference is hereby expressly made for further information regarding the basic function and the basic design of a torque sensor device according to the invention.

A torque sensor device according to the invention is preferably configured here for detecting a torque applied to a shaft, wherein the shaft has a first part and a second part, which is twistable relative to the first part, and in particular the first part and the second part of the shaft are connected to each other by means of a torsion bar. A torque sensor device according to the invention is preferably configured here for detecting the torsion of the first part of the shaft in relation to the second part of the shaft. The applied torque can be determined from the detected torsion of the shaft if the torsional rigidity of the torsion bar of the shaft is known.

The magnetic arrangement preferably has at least one magnetic element for generating at least one magnetic field, and in particular, the at least one magnetic element of the magnetic arrangement can be arranged in particular concentrically with respect to the shaft, that is to say in such a manner that the central axis of the torque sensor device is aligned with the axis of rotation of the shaft, wherein the magnetic arrangement, in particular the at least one magnetic element of the magnetic arrangement, is connectable in particular to a first part of the shaft for rotation therewith.

In an advantageous refinement of a torque sensor device according to the invention, it is the case in particular that a polarity of the magnetic arrangement, in particular of the at least one magnetic element, is constant in an axial direction. This makes it possible to produce the magnetic element particularly easily and thus inexpensively.

The at least one magnetic element of the magnetic arrangement is preferably a permanent magnet, in particular a completely closed ring magnet or a magnet which is similar to a ring magnet and which is virtually closed in a circumferential direction, wherein the magnetic element may in particular have a plurality of ring magnet segments of opposite polarity or corresponding pole pairs which are arranged adjacently to one another in each case with opposite polarity in the circumferential direction, with in particular two mutually adjacent portions of opposite polarity forming a pole pair.

If the magnetic arrangement has one or more further magnetic elements, the latter are particularly preferably likewise configured as previously described and are in particular arranged concentrically with respect to the at least one magnetic element.

Here, within the context of the invention, a "magnet which is similar to a ring magnet" is understood as meaning a magnet, in particular a permanent magnet, which, although not completely closed in the circumferential direction, is configured in such a manner that it virtually, in particular completely, acts like a completely closed ring magnet.

The stator arrangement can preferably likewise be arranged concentrically with respect to the shaft and is in particular connectable to a second part of the shaft for rotation therewith.

In an advantageous refinement of a torque sensor device according to the invention, the stator arrangement is in particular at least partially arranged concentrically with respect to the magnetic arrangement, in particular with respect to the at least one magnetic element, wherein the stator arrangement is in particular at least partially arranged on the outside around the magnetic arrangement, preferably around the at least one magnetic element and in particular with a defined air gap in between.

The stator arrangement serves in particular, and is preferably configured, to conduct a magnetic flux of the magnetic field generated by the magnetic arrangement to the flux guide arrangement.

In an advantageous refinement of a torque sensor device according to the invention, the stator arrangement has in particular a first stator and a second stator which are each arranged concentrically with respect to one another along the central axis, wherein, by means of a relative movement between the magnetic arrangement and the stator arrangement in a circumferential direction, a magnetic flux can be generated in the stator arrangement, in particular one magnetic flux in the first stator and one magnetic flux in the second stator respectively, in particular simultaneously.

In an advantageous refinement of a torque sensor device according to the invention, the first and/or the second stator have/has in particular an annular-disk-shaped stator body and tabs which extend away from said stator body in an axial direction, wherein the tabs are in particular arranged so as to be distributed, in particular uniformly distributed with spacings in between, in a circumferential direction, wherein the tabs in particular extend in each case away from the associated stator body in an axial direction, wherein the first stator and the second stator are preferably configured and arranged in such a manner that the tabs of the first stator and of the second stator each extend in the axial direction from the associated stator body in the direction of the other stator, and in particular each engage in an offset manner with the tabs of the other stator.

In an advantageous refinement of a torque sensor device according to the invention, the stator body of the first and/or the second stator has in particular in each case a radially inner edge and a radially outer edge, wherein the tabs in particular extend away from the radially inner edge of the annular-disk-shaped stator body, in particular all to the same side, that is to say in the same direction.

The directional specification "axially" refers here in each case in a conventional manner in the art to a direction parallel to the axis of rotation of the shaft or to a direction parallel to the central axis of the torque sensor device, the directional specification "circumferential direction" correspondingly refers to a direction of rotation about said axis of rotation or central axis, and the directional specification "radially" refers to a direction which is perpendicular to the axial and circumferential directions. The directional specification "tangentially" correspondingly refers to a direction which is perpendicular to the axial direction and the radial direction.

The number of pole pairs in a circumferential direction of the at least one magnetic element of the magnetic arrangement particularly preferably corresponds here to the number of tabs of the first and/or the second stator. For torque sensor devices for steering shafts of motor vehicles, in particular for use in passenger motor vehicles, a number of 8 tabs for the first stator and the second stator has proven particularly advantageous.

Here, at least one flux guide of the torque sensor device may be arranged on the stator arrangement and either directly fastened to the stator arrangement or received indirectly in the torque sensor device via a holder. However, the flux guide may also be arranged on a housing of the torque sensor device. It is important merely that the flux guide is arranged and positioned within the torque sensor device such that, in each case, the associated magnetic flux can be correspondingly concentrated in the flux guide and conducted by means of the flux guide via the at least one associated transmission surface to at least one magnetic sensor of a magnetic sensor arrangement.

In a further advantageous refinement of a torque sensor device according to the invention, the first stator body and the second stator body are arranged spaced apart from one another in particular in an axial direction, and at least one flux guide is arranged at least partially in between in an axial direction.

It is however basically also possible for the at least one flux guide to be arranged outside the stator arrangement in an axial direction, that is to say along the central axis. The collection surfaces and the transmission surface(s) should however each be configured and oriented such that the magnetic fluxes which are respectively concentrated by the collection surfaces and which are generated by a surrounding magnetic interference field are at least partially, preferably almost completely, or completely, cancelled out in accordance with the invention.

In an advantageous refinement of a torque sensor device according to the present invention, the torque sensor device furthermore has a magnetic sensor arrangement with at least one first magnetic sensor for detecting the magnetic flux which is concentrated, and preferably also amplified and conducted, by the flux guide arrangement, wherein the magnetic sensor arrangement, in particular at least one magnetic sensor of the magnetic sensor arrangement, is configured to generate a sensor signal in a manner dependent on a torque that is applied to the torque sensor device and/or in a manner dependent on a torque that is applied to a shaft that is connected to the torque sensor device. Here, the magnetic sensor arrangement may comprise one or more magnetic sensors, in particular a first magnetic sensor and also a second magnetic sensor, wherein, preferably, at least one magnetic sensor is arranged in the axial gap formed by the transmission surfaces of the first flux guide and of the second flux guide.

At least one magnetic sensor, preferably at least one first and one second magnetic sensor, in particular all of the magnetic sensors of the magnetic sensor arrangement, may in particular be a simple Hall sensor with which a magnetic flux density, running perpendicularly to the sensor surface of the Hall sensor, of a magnetic field, or a component of the magnetic flux density, running perpendicularly to the sensor surface, of the magnetic field can be detected, wherein, particularly preferably, at least the first magnetic sensor, in particular all of the magnetic sensors, is/are arranged fixedly with respect to the housing, that is to say in a stationary or positionally fixed manner in relation to the rotatable shaft.

In a particularly advantageous refinement of a torque sensor device according to the invention, at least one magnetic sensor of the magnetic sensor arrangement, in particular at least one first and one second magnetic sensor, is in particular in each case an SMD magnetic sensor, because this is particularly effective in saving space or structural space, wherein the magnetic sensor is in particular arranged on a printed circuit board which is oriented with its printed circuit board plane normally with respect to the central axis of the stator arrangement or of the torque sensor device. This makes it possible to achieve a particularly compact design of a torque sensor device according to the invention.

"SMD" stands for Surface-Mounted Device (surface-mounted element), wherein, by contrast to previously described "wired" components which are provided for "Through Hole Technology, THT", SMD components do not have any wire connections but instead can be soldered directly onto a printed circuit board by means of solderable transmission surfaces.

In an alternative refinement of a torque sensor device according to the invention, it is however also possible for at least one magnetic sensor of the magnetic sensor arrangement to be a wired magnetic sensor with connection pins, wherein, in this case, the magnetic sensor is preferably arranged such that the connection pins point outward in a radial direction. In this way, even with one or more wired magnetic sensors, it is possible to achieve a compact arrangement, in particular if the connection pins of the wired magnetic sensor are soldered onto a printed circuit board that is oriented with its circuit board plane parallel to the central axis of the stator arrangement or of the torque sensor device. Alternatively, the connection pins may also be connected to a leadframe, in particular may be plugged directly into the latter, in particular to a leadframe which is oriented with its leadframe plane parallel to the central axis of the stator arrangement. This makes it possible to achieve a compact arrangement even with wired magnetic sensors.

In an advantageous refinement of a torque sensor device according to the invention, the torque sensor device in particular also has a control device which is configured to determine a torque applied to a shaft, which is functionally connected to the torque sensor device, in a manner dependent on the magnetic flux detected by means of the magnetic sensor arrangement, and/or in a manner dependent on a sensor signal that is generated in a manner dependent on the detected magnetic flux.

The magnetic sensor arrangement of a torque sensor arrangement according to the invention may in particular also have two or more magnetic sensors, in particular a first and a second magnetic sensor. This makes it possible in particular for the torque sensor signal to be evaluated or provided redundantly, and thus allows increased functional reliability of the torque sensor device.

If a torque sensor device according to the invention has a first magnetic sensor and a second magnetic sensor, the second magnetic sensor is particularly preferably arranged parallel to the first magnetic sensor, preferably in a plane with the first magnetic sensor, in particular in a common plane that is perpendicular to the central axis. This makes it possible for the two magnetic sensors to be fastened on a common board or printed circuit board, in particular if the two magnetic sensors are SMD magnetic sensors, wherein the printed circuit board in this case preferably extends in a plane that is perpendicular to the central axis.

In this case, a flux guide has in particular two transmission surfaces, wherein the two transmission surfaces of a flux guide are preferably arranged in a plane.

If the magnetic sensor arrangement has several magnetic sensors, it is then the case in particular that at least one flux guide has several transmission surfaces, in particular a respectively associated transmission surface for each magnetic sensor, wherein, in this case, the first collection surface, and if present the second collection surface, are in particular each magnetically conductively coupled, in particular magnetically conductively connected, to the transmission surfaces of the associated flux guide, and the flux guide is configured, in such a way that a respective magnetic flux that is concentrated and/or amplified in the associated flux guide can be transmitted in accordance with the present invention preferably via each of the transmission surfaces to the magnetic sensor arrangement, in particular to a magnetic sensor, assigned to the respective transmission surface, of the magnetic sensor arrangement. That that is to say, in the case of two magnetic sensors, the first flux guide preferably has a first transmission surface and also a second transmission surface for transmitting and/or conducting the magnetic flux that is concentrated in the associated flux guide.

It is however also possible for several magnetic sensors to be arranged adjacent to one and the same transmission surface, that is to say to receive a first and/or second magnetic flux via the same common transmission surface. For example, the first flux guide may have a transmission surface for two arranged in a common plane and the second flux guide may likewise have a common opposite transmission surface of the first flux guide. The second flux guide may however for example also have two individual separate transmission surfaces which each form a gap with the common transmission surface, in which gap in each case one magnetic sensor is or can be arranged. Likewise, the first flux guide may have two individual transmission surfaces which may be arranged opposite two individual transmission surfaces of the second flux guide or opposite one common transmission surface of the second flux guide.

It is however particularly preferable for the two flux guides to each have two transmission surfaces, with in each case one transmission surface of the first flux guide being arranged parallel to a transmission surface of the second flux guide, said transmission surfaces preferably being arranged one above the other with a gap in between, into which gap a respective magnetic sensor projects in a radial direction. It is preferable here if a first magnetic sensor is arranged in particular in an axial gap between the first transmission surfaces of the two flux guides and extends in a radial direction into the gap between the first transmission surfaces, in particular parallel to the first transmission surfaces, whilst a second magnetic sensor projects in particular into the axial gap between the two transmission surfaces of the two first and second flux guides.

In this case, a torque sensor device according to the invention is particularly preferably configured such that the magnetic sensors can be arranged in a plane, in particular on one and the same printed circuit board or board. This yields a particularly advantageous design of a torque sensor device according to the invention. If SMD magnetic sensors are used, a torque sensor device with a small structural height and thus a small structural space requirement in an axial direction, that is to say in the direction of the central axis, can be provided.

For a particularly small structural height, the printed circuit board may a have a smaller thickness in the region of one or more magnetic sensors or of one or more transmission surfaces than in the remaining region. A reduction in thickness of the printed circuit board may be achieved for example by means of corresponding grooves, which are formed in particular on an underside of the printed circuit board, or one or more cutouts in said region, into which, in particular, the transmission surfaces that face toward the bottom side of the printed circuit board can engage or project.

The first flux guide and the second flux guide, in particular the collection surface(s) and transmission surface(s) thereof, are preferably in each case configured and arranged relative to one another and magnetically conductively coupled to one another, and particularly preferably coordinated in terms of size with one another and relative to the size of the respective surfaces of the other flux guide, in such a way that the first interference flux component generated by the magnetic interference field and concentrated and the second interference flux component generated by the magnetic interference field and concentrated are oriented preferably in opposite directions, and are in particular of equal value or have the same strength, that is to say are of the same magnitude, in the gap between the transmission surfaces.

The second flux guide is particularly preferably arranged opposite the first flux guide in the direction of the central axis, in particular such that the first collection surface of the second flux guide is arranged parallel to, in particular opposite, the first collection surface of the first flux guide, wherein the first collection surfaces are in particular configured to be congruent with respect to one another.

To reduce a variety of parts or a variety of variants and thus the costs for a torque sensor device, the second flux guide is particularly preferably of identical configuration to the first flux guide, that is to say in particular is of geometrically identical configuration or is an identical part, wherein the second flux guide is however preferably arranged so as to be turned through 180° in relation to the first flux guide, such that in each case the first collection surfaces and the second collection surfaces and the transmission surface(s) are arranged opposite one another and so as to form an axial gap.

In a further advantageous refinement of a torque sensor device according to the invention, at least one flux guide, preferably all of the flux guides, is or are in particular a punched part or a punched and bent part, and in particular produced from a sheet-metal material, particularly preferably from a magnetically soft material, such as is generally known from the prior art. This permits particularly simple, cost-effective and, with regard to the geometry, flexible production of a flux guide with good magnetic characteristics.

In a particularly advantageous refinement of a torque sensor device according to the present invention, the first flux guide furthermore likewise has a second collection surface, wherein the second collection surface of the first flux guide is magnetically conductively coupled to the at least one transmission surface of the first flux guide and is likewise configured to generate and/or to at least partially concentrate and conduct a second magnetic interference flux in a manner dependent on a magnetic interference field surrounding the torque sensor device, wherein the first flux guide and the second flux guide are each configured and arranged relative to one another such that, if the torque sensor device is surrounded by a magnetic interference field, a first interference flux component of the second magnetic flux, which component is at least partially concentrated in the first collection surface of the second flux guide and transmitted via the at least one transmission surface of the second flux guide to the magnetic sensor, and a second interference flux component of the first magnetic flux, which component is partially concentrated in the second collection surface of the first flux guide and transmitted via the at least one transmission surface of the first flux guide to the magnetic sensor, at least partially cancel one another out.

The robustness of the torque sensor device can be further increased in this way. Firstly, it is also possible for a by means of an opposing external interference field, which leads to a first interference flux component in the first collection surface of the second flux guide, to be at least partially or almost completely, or completely, compensated. Secondly, a further improved reduction or further improved compensation of a first interference flux component that is generated in the first collection surface of the first flux guide can be achieved because, by means of the further second collection surface of the first flux guide, coupling of the second interference flux that is concentrated by the second collection surface of the second flux guide into the stator arrangement can be reduced or in some cases even entirely avoided, wherein, in this case, a second interference flux component can particularly preferably be discharged into the surroundings via the second collection surface of the first flux guide.

Here, the second collection surface of the first flux guide is preferably arranged parallel to the second collection surface of the second flux guide in particular in the direction of the central axis, and is in particular formed opposite said second collection surface and particularly preferably in particular so as to be congruent with respect to said second collection surface.

In a further advantageous refinement of a torque sensor device according to the present invention, the first collection surface and/or the second collection surface and/or at least the first transmission surface, in particular all of the transmission surfaces (if several are present), of at least one flux guide extends at least partially, in particular almost completely, or completely, in a plane that runs perpendicular to the central axis of the torque sensor device, that is to say in a normal plane with respect to the central axis or in a plane that extends normally with respect to the central axis, that is to say is orthogonal with respect to the central axis. In this way, it is particularly easily possible for the collection surfaces of the flux guide to be arranged in a manner which is advantageous or necessary for compensation of the interference flux.

If the first collection surface and/or the second collection surface of at least one flux guide extend in particular in a radial direction and in a circumferential direction, a particularly advantageous flux guide, in particular a particularly compact and effective flux guide, can be provided.

The first collection surface and/or the second collection surface of at least one flux guide may each in particular be in the form of annular segments, which is particularly advantageous with regard to a structural space requirement of the torque sensor device in a radial direction, in particular if the first collection surface of at least one flux guide is configured in this way, because said first collection surface can then, in the case of a corresponding design, be arranged within a structural space required for the stator arrangement, with virtually no additional structural space requirement.

At least one collection surface may however also be of rectangular, for example square or similar configuration, or may be oval or kidney-shaped or the like. It is substantially of importance that the collection surface performs the desired function and targetedly and adequately concentrates the respectively desired magnetic flux with the desired flux direction and conducts said magnetic flux with the desired flux direction, in particular a flux direction that is advantageous for the function of the torque sensor device, to the transmission surface(s) of the associated flux guide.

In a further possible advantageous refinement of a torque sensor device according to the present invention, the first collection surface and/or the second collection surface of at least one flux guide have in particular a similar or identical shape. It is alternatively or additionally also possible for the first collection surface of one of the two flux guides and the second collection surface of the other of the two flux guides in each case to have, in particular, a similar or identical shape, wherein the first collection surface and the second collection surface may in particular each be configured so as to be congruent. It is thus possible, in particular by means of similar concentrating behavior of the two collection surfaces of the flux guide, to achieve good compensation of a magnetic flux that is generated by a magnetic interference field, assuming a corresponding situation, size and orientation of the first and second collection surfaces relative to one another. In principle, however, the collection surfaces of a flux guide may also be configured differently.

In a further possible and advantageous refinement of a torque sensor device according to the present invention, at least one transmission surface is preferably of rectangular configuration, in particular similarly to the geometry of the associated magnetic sensor. It is thus possible to achieve that the resulting magnetic flux that is concentrated in the flux guide is transmitted or coupled effectively from the transmission surface into the magnetic sensor arrangement, in particular into the respective associated magnetic sensor that is arranged adjacent to the transmission surface with a defined gap.

In an advantageous refinement of the torque sensor device according to the present invention, the first and/or the second collection surface and/or one of the transmission surfaces, in particular all of the transmission surfaces, are in each case of plate-like or disk-like configuration, wherein a thickness of the flux guide in the region of the first and/or of the second collection surface and/or of at least one of the transmission surfaces, in particular of all of the transmission surfaces, in the direction of the central axis, that is to say parallel to the central axis, is in each case very much smaller than that in a radial direction and in a circumferential direction.

In a further advantageous refinement of a torque sensor device according to the present invention, the second collection surface of at least one flux guide preferably extends at least partially, in particular almost completely, or completely, parallel to the first collection surface of the associated flux guide, in particular in a different plane than first collection surface. Particularly good compensation of a magnetic flux generated by a magnetic interference field, in particular particularly good compensation of a first interference flux component, can thus be achieved.

Here, the at least one transmission surface of the flux guide particularly preferably extends at least partially, in particular almost completely, or completely, in a different plane than the first collection surface and/or in a different plane than the second collection surface. A flux guide which is advantageous for compensating a magnetic flux generated by a magnetic interference field can thus be easily provided.

In a further particularly advantageous and therefore preferred refinement of a torque sensor device according to the present invention, at least one transmission surface of at least one flux guide extends at least partially, in particular almost completely, or completely, in a plane that lies between the first collection surface and the second collection surface in the direction of the central axis, that is to say between the first collection surface and the second collection surface of the associated flux guide in an axial direction. Particularly good compensation of a magnetic flux that is generated by a magnetic interference field, in particular particularly good compensation of a first interference flux component, in particular in the gap between the transmission surfaces, can thus be easily achieved.

In a further advantageous refinement of a torque sensor device according to the present invention, the first collection surface of at least one flux guide is preferably arranged at least partially, preferably almost completely, or completely, within the stator arrangement in a radial direction, in particular so as to at least partially overlap said stator arrangement in a radial direction. A torque sensor device which is particularly compact, in particular in a radial and/or axial direction, can thus be provided.

If, as described above, the stator arrangement has a stator with an annular-disk-shaped stator body, the first collection surface of at least one flux guide is preferably arranged so as to at least partially overlap, preferably completely overlap, the annular-disk-shaped stator body in a radial direction, wherein the first collection surface preferably does not extend beyond an outer edge of the annular disk in a radial direction. A torque sensor device which is particularly compact, in particular in a radial direction, can thus be provided.

In a further particularly advantageous refinement of a torque sensor device according to the present invention, the second collection surface of at least one flux guide extends further outward in a radial direction than the first collection surface of the associated flux guide and/or is arranged further to the outside in a radial direction than the first collection surface of the associated flux guide.

That is to say, the second collection surface of at least one flux guide, in particular a center of area of said second collection surface, is preferably arranged so as to be spaced apart in a radial direction from the central axis by a greater distance than the first collection surface of the associated flux guide. Reduced concentration of the magnetic flux that is generated in a manner dependent on the magnetic working field, and intensified concentration of the magnetic interference field surrounding the torque sensor device, can thus be achieved in the second collection surface, whereby an undesired reduction of the magnetic flux that is dependent on the magnetic working field can be lessened, but improved compensation of the magnetic flux that is dependent on the magnetic interference field can be achieved. The further outward in a radial direction the second collecting surface is arranged, the greater is the component of the magnetic flux generated by the magnetic interference field that can be concentrated by the second collection surface with the second flux direction, and therefore the greater is the component of the magnetic flux generated by the magnetic interference field and concentrated in the first collection surface that can be compensated.

By contrast, the first collection surface is preferably arranged as close as possible to the stator arrangement in order to achieve good concentration of the magnetic flux that is generated in the stator arrangement, in particular good concentration of the magnetic flux which is generated in the stator arrangement by the magnetic working field and on the basis of which the torque signal is generated, in particular within said stator arrangement in a radial direction.

In a possible refinement of a torque sensor device according to the present invention which is particularly advantageous with regard to the structural space requirement in an axial direction, the first collection surface and/or the second collection surface and/or at least one transmission surface, in particular all of the transmission surfaces, of at least one flux guide, particularly preferably the entire respective flux guide, is preferably arranged within the stator arrangement in an axial direction, in particular between the annular disks of the first stator and of the second stator in an axial direction, that is to say in the direction of the central axis, and/or in each case between the annular-disk-shaped stator bodies in an axial direction, that is to say within the stator arrangement, in particular at least partially laterally adjacent to the stator arrangement, at a level along the central axis in an axial direction, wherein the second collection surface of at least one flux guide is in particular arranged at the level of the stator arrangement in an axial direction. This makes it possible to achieve a particularly compact design of a torque sensor device according to the invention in particular in an axial direction.

In order for the magnetic flux generated by a magnetic interference field surrounding the torque sensor device to be concentrated as effectively as possible in the second collection surface of at least one flux guide, said second collection surface is, if arranged at the level of the stator arrangement in an axial direction, preferably arranged at least partially, preferably almost completely, or completely, outside the stator arrangement in a radial direction, in particular so as not to overlap said stator arrangement in a radial direction.

In an alternative but likewise possible refinement, the second collection surface of at least one flux guide may however also be arranged above or below the stator arrangement in an axial direction along the central axis, in particular with a defined spacing to said stator arrangement, in particular with a defined minimum spacing, in order to reduce or substantially, in particular completely, avoid coupling of a magnetic flux that is generated in the stator arrangement into the second collection surface. In this case, the second collection surface of at least one flux guide may also be arranged at least partially or entirely within the stator arrangement, and in particular so as to overlap said stator arrangement, in a radial direction. A defined spacing, in particular a defined minimum spacing, of the second collection surface to the stator arrangement in an axial direction is however important in order to reduce or avoid coupling of a magnetic flux that is generated in the stator arrangement into the second collection surface.

For good compensation, in particular for the most complete possible compensation, of the first interference flux component which is generated by the magnetic interference field and concentrated in the first collection surface and which falsifies the useful torque signal, the second interference flux component, which is generated by the magnetic interference field and concentrated by the second collection surface, should have the same magnitude, but an opposite flux direction in relation to the first interference flux component, in the gap between the transmission surfaces.

By way of the size of the second collection surface of the respective flux guide, the magnitude of the magnetic interference flux component that is concentrated by the second collection surface can be influenced, in particular adapted for a defined magnetic interference field in such a way as to achieve good compensation of the first interference flux component, which is generated in the stator arrangement and in particular concentrated by the other flux guide.

In a further advantageous refinement of a torque sensor device according to the present invention, a size of the second collection surface is therefore selected such that a second magnetic interference flux which is generated by a defined magnetic interference field surrounding the torque sensor device and with a defined field direction and which is focused by the second collection surface is of such a magnitude that a defined component of the first interference flux, in particular a component of at least 25%, 50% or 75% of the first interference flux generated by the magnetic interference field, is compensated, preferably in the axial gap between the at least one transmission surface of the first flux guide and the at least one transmission surface of the second flux guide.

That is to say, the size of the second collection surface of at least one flux guide is preferably selected such that, in the presence of a defined magnetic interference field surrounding the torque sensor device and with a defined field direction, the magnetic flux that is generated by said magnetic interference field and concentrated in the first collection surface of the other flux guide is at least partially compensated, in particular at least 25%, 50% or 75% compensated, in particular completely compensated, that is to say 100% compensated, by the second magnetic flux that is generated by said magnetic interference field and concentrated by the second collection surface, such that undesired influencing or falsification of the resulting magnetic flux, which is generated in a manner dependent on the magnetic working field and which is conducted via the transmission surface to the magnetic sensor device, by the magnetic interference field is reduced or even avoided entirely, and a resulting magnetic flux at the magnetic sensor includes only minor or no interference components.

Here, the second collection surface of at least one flux guide is particularly preferably configured, and in particular the size thereof is selected, in such a way that the resulting magnetic flux that acts on the magnetic sensor is dependent only on the magnetic working field and/or the applied torque and the relative movement between the magnetic arrangement and the stator arrangement, but not on the magnetic interference field.

It has proven to be particularly advantageous if the size of the area of the second collection surface is at least approximately 75%, 100%, 125%, 150%, 200% or 250% of the size of the area of the first collection surface of the associated flux guide and/or of the other flux guide, but is at most approximately 100%, 150%, 200%, 250% or 300% of the size of the area of the first collection surface of the associated flux guide and/or of the other flux guide.

In a further advantageous refinement of a torque sensor device according to the present invention, the second collection surface of at least one flux guide is in particular at least as large as the first collection surface of the associated flux guide and/or of the other flux guide, preferably of approximately or exactly the same size as, that is to say of similar size to, or at least 1.3 times, 1.5 times, 2 times, 2.5 times or 3 times, but in particular at most 4 times, the size of, the first collection surface.

In a further particularly advantageous and therefore preferred refinement of a torque sensor device according to the present invention, at least one flux guide has a connecting portion by means of which, in particular, the first collection surface and a second collection surface of at least one flux guide are magnetically conductively coupled, in particular connected, to one another, wherein the connecting portion may particularly preferably extend parallel to the central axis and in a radial direction and/or parallel to the central axis and in a circumferential direction.

Here, the first collection surface and/or the second collection surface are preferably furthermore connected via said connecting portion, and/or via at least one further connecting portion, to at least one transmission surface, wherein the further connecting portion may in this case also extend in particular in a radial direction and parallel to the central axis and/or parallel to the central axis and in a circumferential direction.

Here, at least one connecting portion may run substantially parallel, or parallel, to the central axis. At least one connecting portion may however also run in a curved manner and/or in an inclined manner, obliquely or the like relative to the central axis.

By means of a connecting portion, it is particularly easily possible to realize a magnetically conductive coupling or connection of the collection surfaces, or of the collection surfaces to one or more transmission surfaces. The at least one transmission surface of a flux guide according to the invention or of a flux guide arrangement according to the invention or of a torque sensor arrangement according to the invention is preferably magnetically conductively coupled, in particular via a connecting portion, to the first collection surface and/or the second collection surface (if present) of the associated flux guide. If two transmission services are provided per flux guide, the two transmission surfaces may be coupled to the same collection surface of the associated flux guide, in particular via a common connecting portion or via respectively separate connecting portions. It is however alternatively also possible for a first transmission surface to be coupled via a first connecting portion to the first collection surface and for the second transmission surface to be coupled via a second connecting portion to the second collection surface. It is important merely that the evaluation is correctly performed at a later point in time, and the collection surfaces of a respective flux guide are in each case correspondingly magnetically conductively coupled to the associated transmission surfaces of the flux guide, and that at least one transmission surface of the first flux guide and at least one transmission surface of the second flux guide are in particular arranged so as to form an axial gap into which an associated magnetic sensor of a magnetic sensor arrangement can project in order to generate the torque sensor signal. It is thus possible to implement an extremely wide variety of designs of a flux guide according to the invention which are advantageous from a structural space aspect.

In the context of the invention, "magnetically conductively coupled" means that a magnetic flux can be guided from one surface to the other, in particular without passing through a gap. That is to say, surfaces that are magnetically conductively coupled to one another are preferably also electrically conductively coupled or connected to one another.

In one possible refinement of a torque sensor device according to the present invention, at least one flux guide is of single-part form. In this way, the number of components required for a torque sensor device according to the invention can be easily reduced. This has an advantageous effect on production costs, on the assembly process per se, and on assembly costs, because fewer parts have to be assembled.

In an alternative but likewise possible refinement of a torque sensor device according to the present invention, in particular in a further development, at least one flux guide is of multi-part form, in particular two-part form, that is to say is assembled from multiple, in particular two, parts, with one part of the flux guide preferably comprising the first collection surface or the second collection surface and optionally one or more transmission surfaces, and a further part preferably comprising the other collection surface.

This allows a flexible adaptation of the flux guide and thus of the torque sensor device to different applications, for example for different vehicles with different magnetic interference fields surrounding the torque sensor device during operation. In particular if the second collection surface of at least one flux guide is formed by a separate component or is part of a separate component of the flux guide, a size and/or situation and/or orientation of the second collection surface of at least one flux guide can be easily adapted by exchanging said component, for example. Compensation of the magnetic interference field flux can thus be easily improved. This applies correspondingly to the first collection surface and/or one or more transmission surfaces.

It is likewise thus possible, firstly, for conventional torque sensor devices or conventional flux guides to be retrofitted to become a torque sensor device according to the invention or to become a flux guide according to the invention. Furthermore, a multi-part flux guide, if designed correspondingly, makes it possible to easily provide multiple variants of torque sensor devices with differently configured interference flux compensation whilst making extensive use of identical parts, in particular makes it possible to provide a torque sensor device without interference flux compensation and one or more torque sensor devices with magnetic interference field compensation, wherein, in each case, it is merely necessary to provide a corresponding additional or different flux guide part.

A flux guide arrangement for a torque sensor device, in particular for a torque sensor device according to the invention, has at least one first flux guide and one second flux guide, wherein the first flux guide and the second flux guide each have a first collection surface and each have at least one transmission surface, wherein the first collection surfaces are each configured to at least partially concentrate and/or to at least partially conduct a magnetic working flux, which is generated in the stator arrangement of a torque sensor device in a manner dependent on an applied torque, and/or a first magnetic interference flux, which is generated in a manner dependent on a magnetic interference field surrounding the torque sensor device.

Here, the at least one transmission surface of the first flux guide and the at least one transmission surface of the second flux guide are arranged opposite one another so as to between them form an axial gap in which at least one magnetic sensor of a magnetic sensor arrangement can be arranged, wherein a first magnetic flux that is concentrated in the first flux guide can be transmitted via the at least one transmission surface of the first flux guide to a magnetic sensor, arranged in the axial gap, of a magnetic sensor arrangement, and wherein a second magnetic flux that is concentrated in the second flux guide can be transmitted via the at least one transmission surface of the second flux guide to the magnetic sensor.

According to the invention, the second flux guide furthermore has a second collection surface which is magnetically conductively coupled to the at least one transmission surface of the second flux guide and which is configured to generate and/or to at least partially concentrate and conduct a second magnetic interference flux in a manner dependent on a magnetic interference field surrounding the torque sensor device, wherein the first flux guide and the second flux guide are each configured and arranged relative to one another such that, if the torque sensor device is surrounded by a magnetic interference field, a first interference flux component of the first magnetic flux, which component is at least partially concentrated in the first collection surface of the first flux guide and transmitted via the at least one transmission surface of the first flux guide to the magnetic sensor, and a second interference flux component of the second magnetic flux, which component is at least partially concentrated in the second collection surface of the second flux guide and transmitted via the at least one transmission surface of the second flux guide to the magnetic sensor, at least partially cancel one another out, in particular in the gap formed by the transmission surfaces.

In a particularly advantageous refinement of a flux guide arrangement according to the present invention, the first flux guide furthermore likewise has a second collection surface, wherein the second collection surface of the first flux guide is magnetically conductively coupled to the at least one transmission surface of the first flux guide and is likewise configured to generate and/or to at least partially concentrate and/or conduct a second magnetic interference flux in a manner dependent on a magnetic interference field surrounding a torque sensor device, wherein the first flux guide and the second flux guide are each configured and arranged relative to one another such that, if the torque sensor device is surrounded by a magnetic interference field, a first interference flux component of the second magnetic flux, which component is at least partially concentrated in the first collection surface of the second flux guide and transmitted via the at least one transmission surface of the second flux guide to the magnetic sensor, and a second interference flux component of the first magnetic flux, which component is at least partially concentrated in the second collection surface of the first flux guide and transmitted via the at least one transmission surface of the first flux guide to the magnetic sensor, at least partially cancel one another out.

A flux guide according to the invention for a flux guide arrangement of a torque sensor device is configured in particular for use in a flux guide arrangement according to the invention and/or for use in a torque sensor device according to the invention and has a first collection surface and at least one transmission surface, wherein the first collection surface is configured to at least partially concentrate and/or to at least partially conduct a magnetic working flux, which is generated in the stator arrangement of a torque sensor device in a manner dependent on an applied torque, and/or a first magnetic interference flux, which is generated in a manner dependent on a magnetic interference field surrounding the torque sensor device, wherein a magnetic flux that is concentrated in the flux guide can be transmitted via the at least one transmission surface of the flux guide to an adjacently arranged magnetic sensor of a magnetic sensor arrangement.

The flux guide according to the invention is distinguished by the fact that the flux guide furthermore has a second collection surface which is magnetically conductively coupled to the at least one transmission surface of the flux guide and which, in a functional state of use of the flux guide in a torque sensor device, is configured to generate and/or to at least partially concentrate and conduct a second magnetic interference flux in a manner dependent on a magnetic interference field surrounding the torque sensor device.

A flux guide according to the invention is furthermore configured to be arranged together with another flux guide for a flux guide arrangement according to the invention, and/or together with another flux guide for a torque sensor device according to the invention, in a torque sensor device according to the invention such that, if the torque sensor device is surrounded by a magnetic interference field, a first interference flux component, which is at least partially concentrated in the first collection surface of the other flux guide and transmitted via the at least one transmission surface of the first other guide, in particular to at least one magnetic sensor of a magnetic sensor arrangement, and a second interference flux, which is at least partially concentrated in the second collection surface of the flux guide and transmitted via the at least one transmission surface of the flux guide, in particular to the magnetic sensor, at least partially cancel one another out.

All of the features described and embodiments presented with regard to a torque sensor device, and the respective advantages thereof, also apply correspondingly in each case to a flux guide arrangement according to the invention and to a flux guide according to the invention and vice versa where technically possible or feasible, even if these have been described in each case only once in conjunction with only one of these subjects of the invention.

Further features of the invention are evident from the claims, the figures, and the description of the figures. All of the features and combinations of features that are mentioned in the description above, and also the features and combinations of features that are in each case illustrated in the figures and/or mentioned in the description, may be used not only in the respectively specified combination but also in other combinations or on their own, if they are technically feasible.

Figures 5B, 6A:
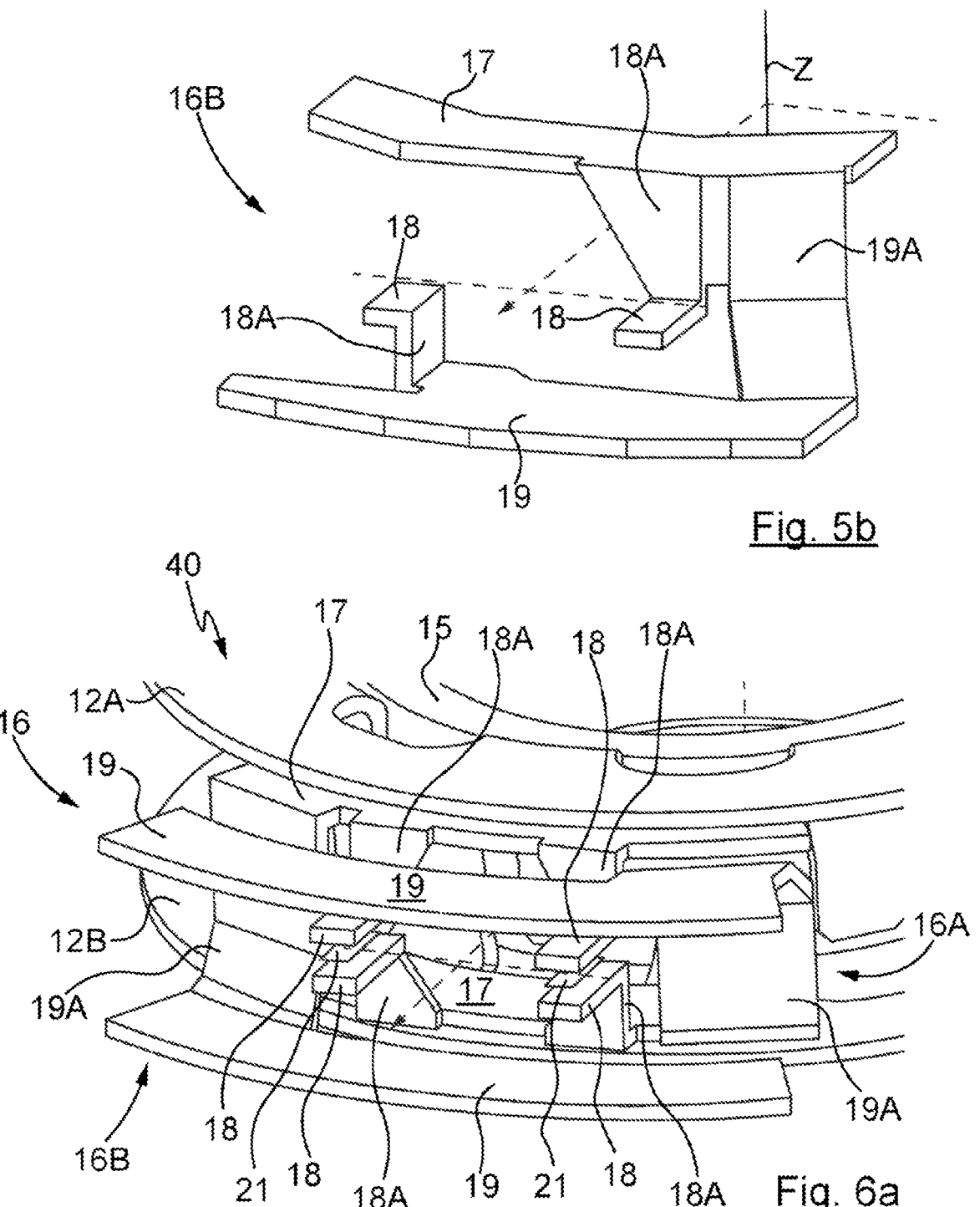
Figures 6B, 6C, 7A:
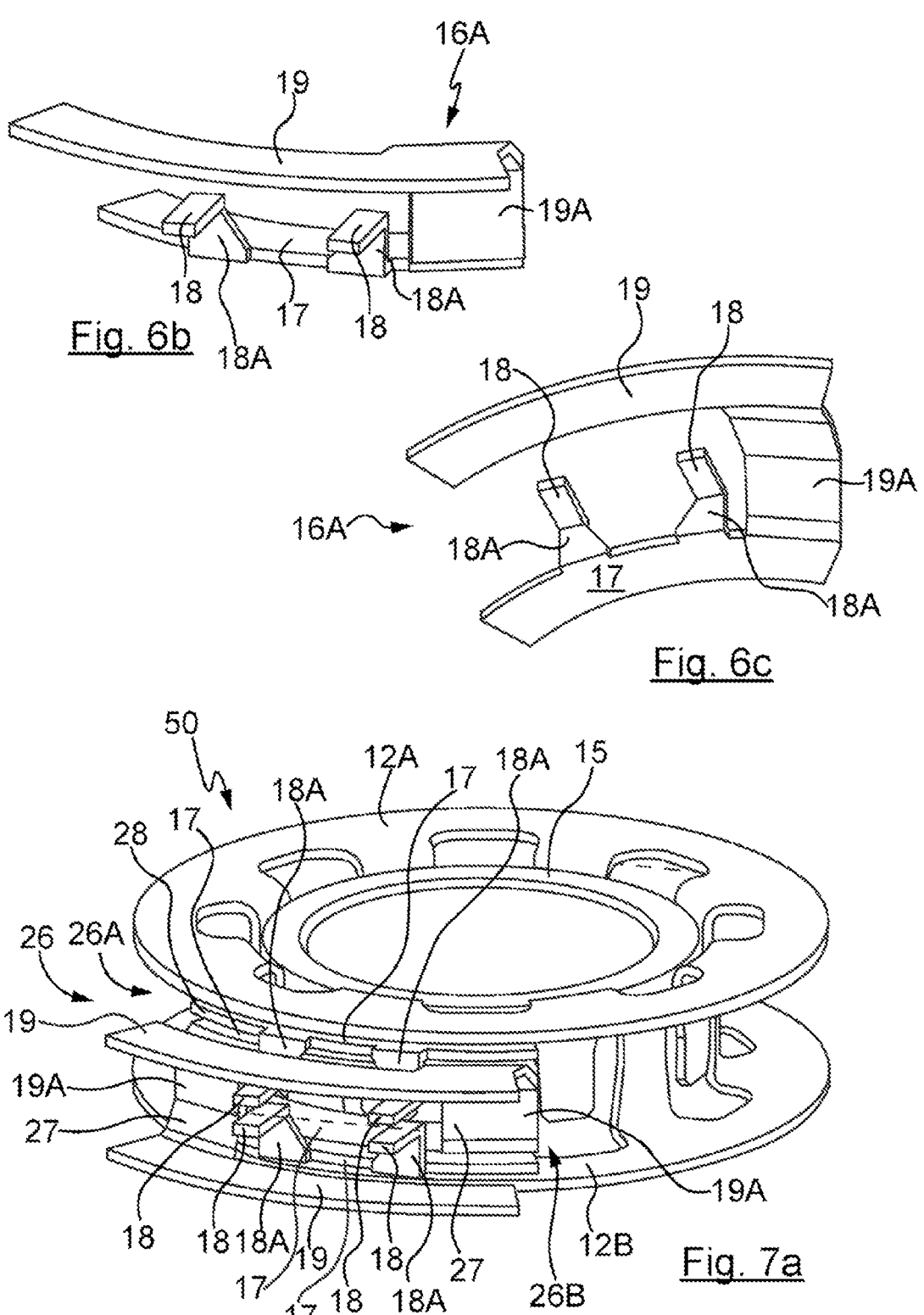
Figure 7B:
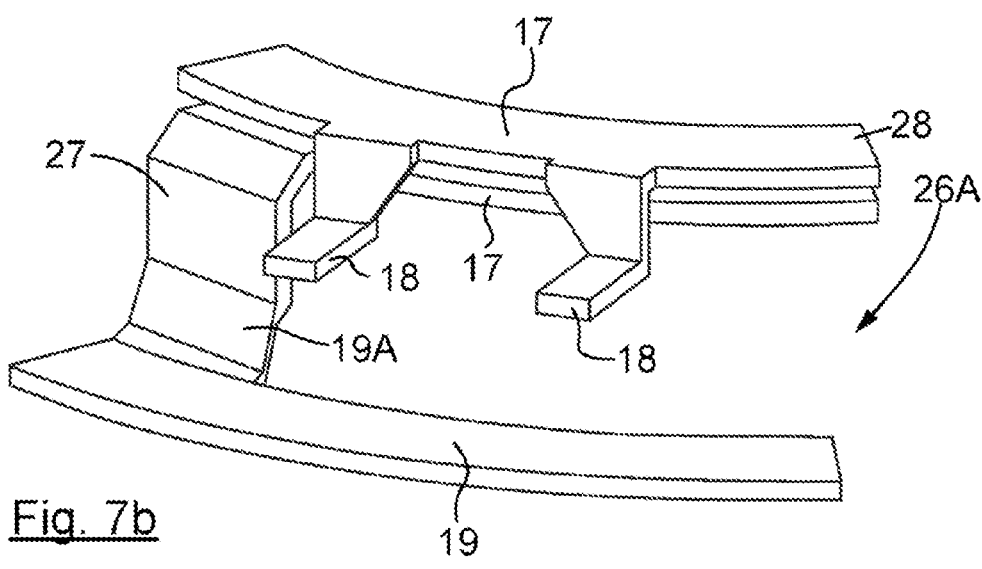
Figure 7C:
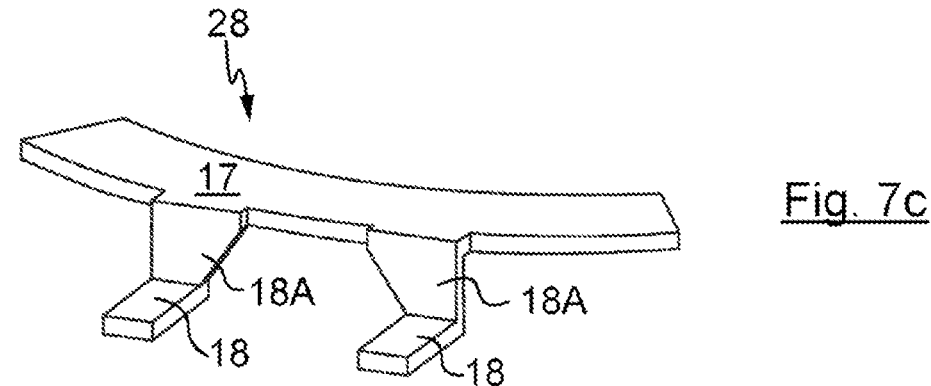
Figure 7D:
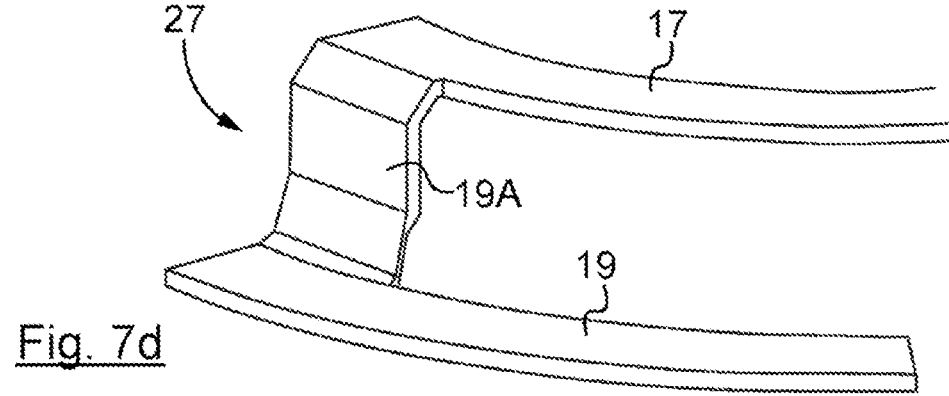
Figures 8A, 8B:
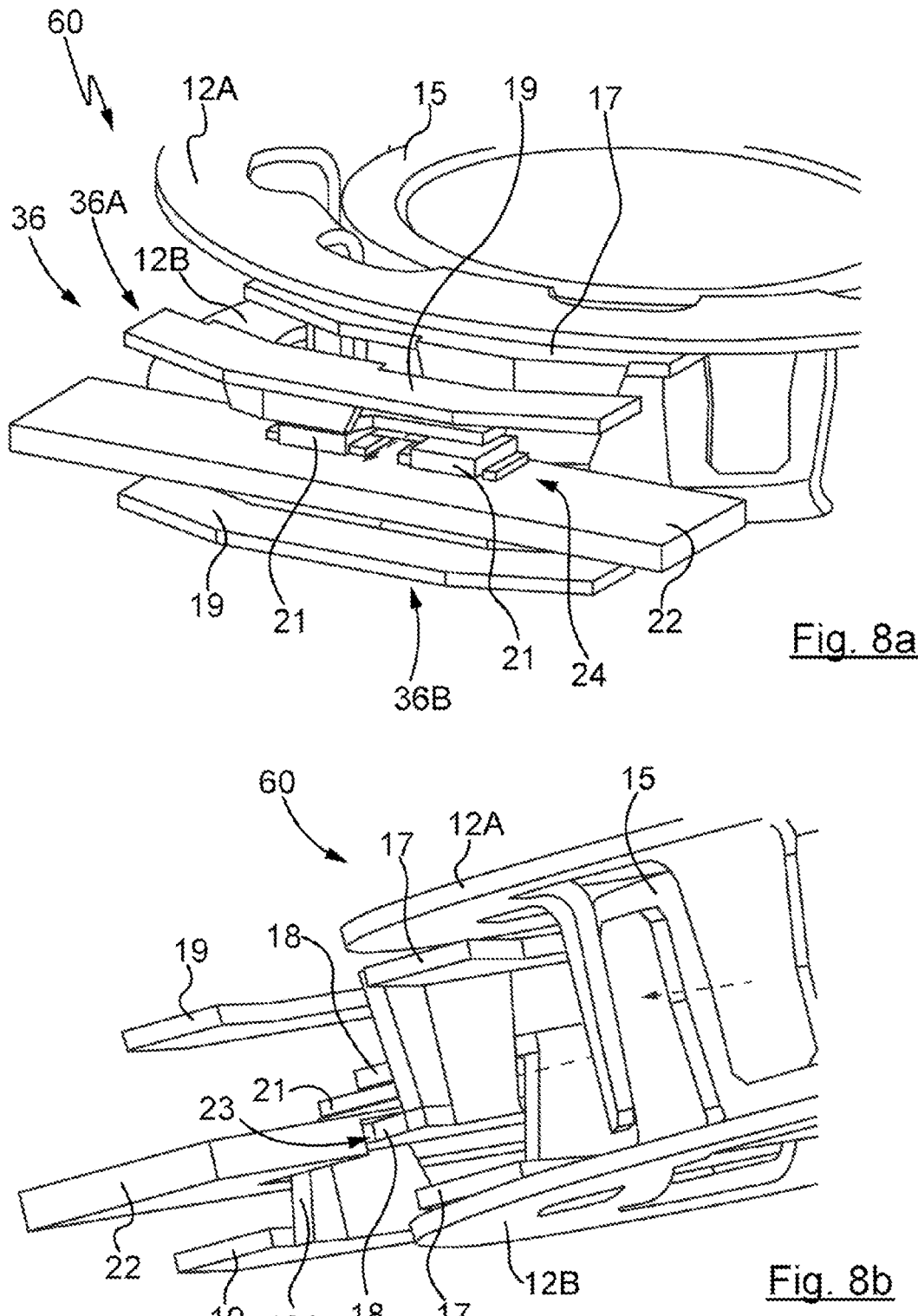
Figures 9A, 9B:
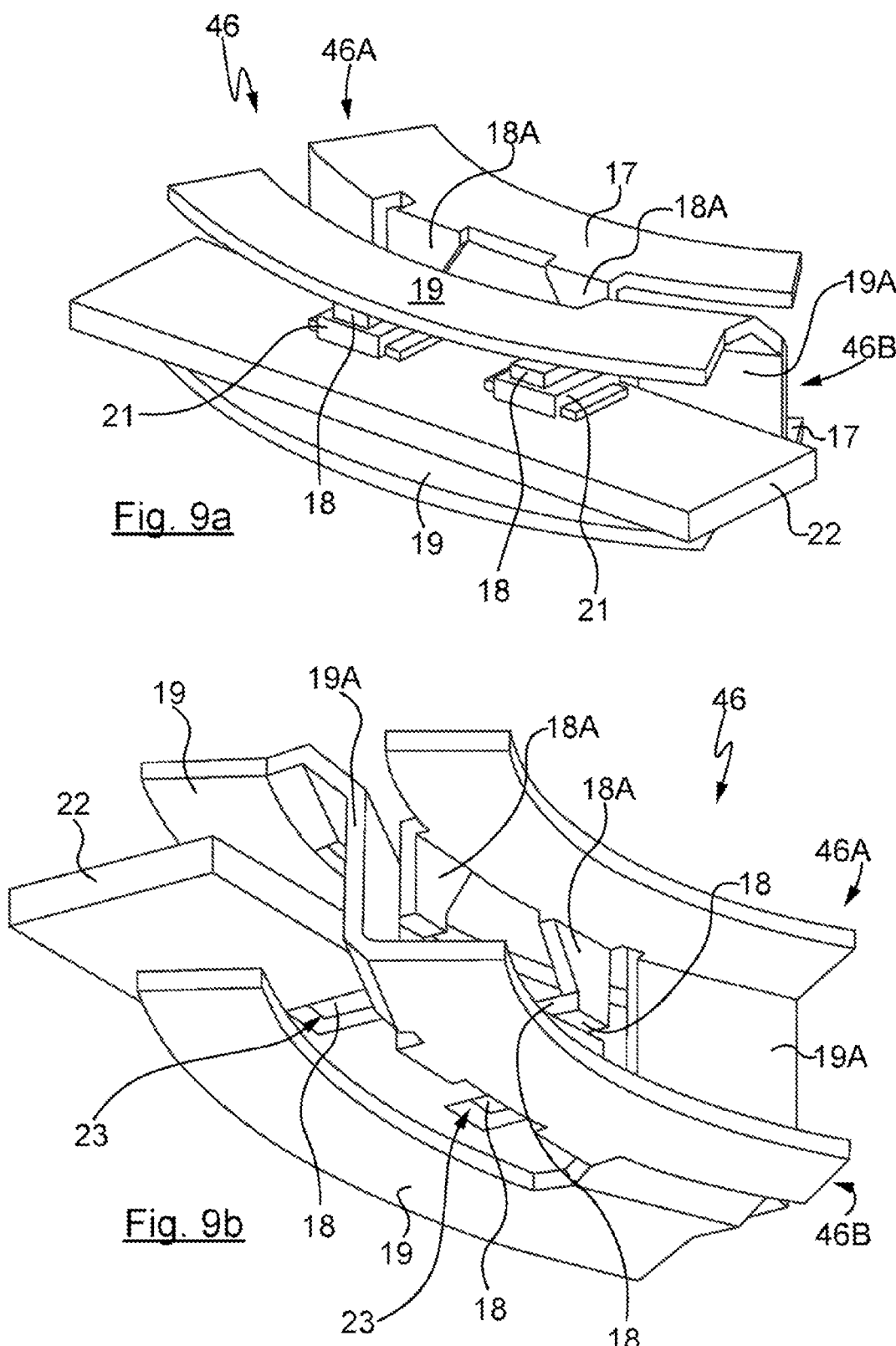
Figure 9C:
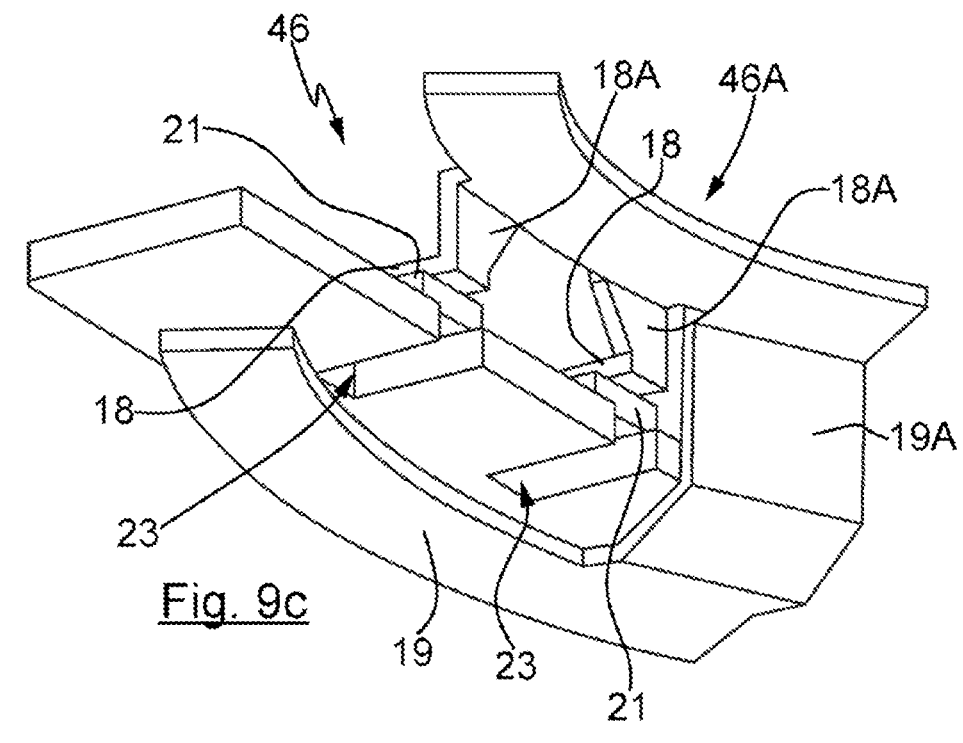
Figure 10:
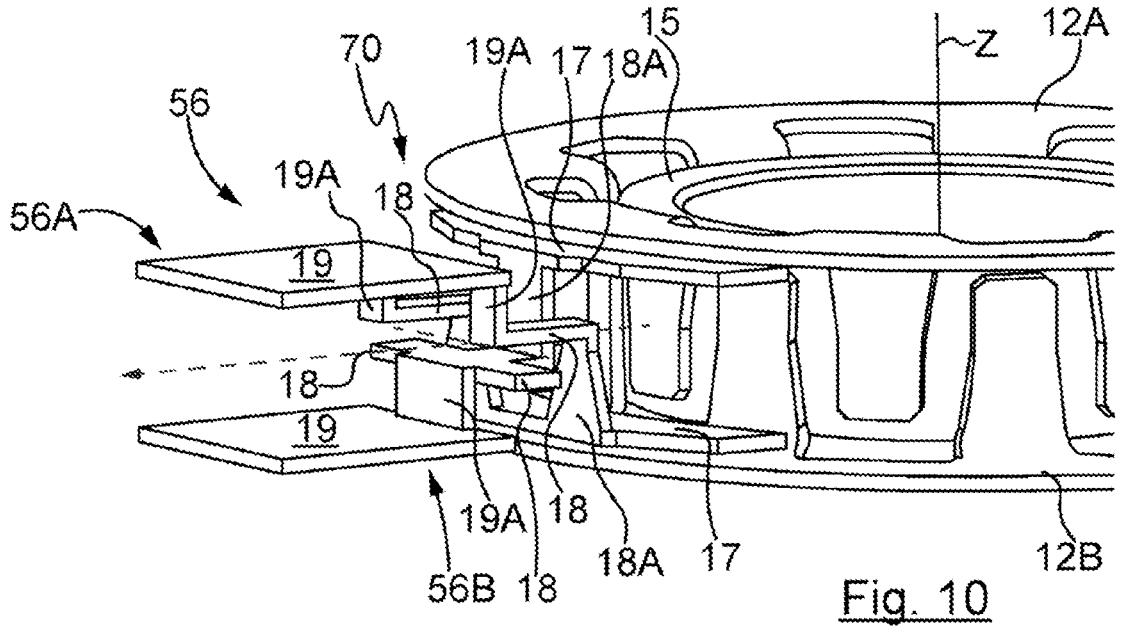
Figure 11:
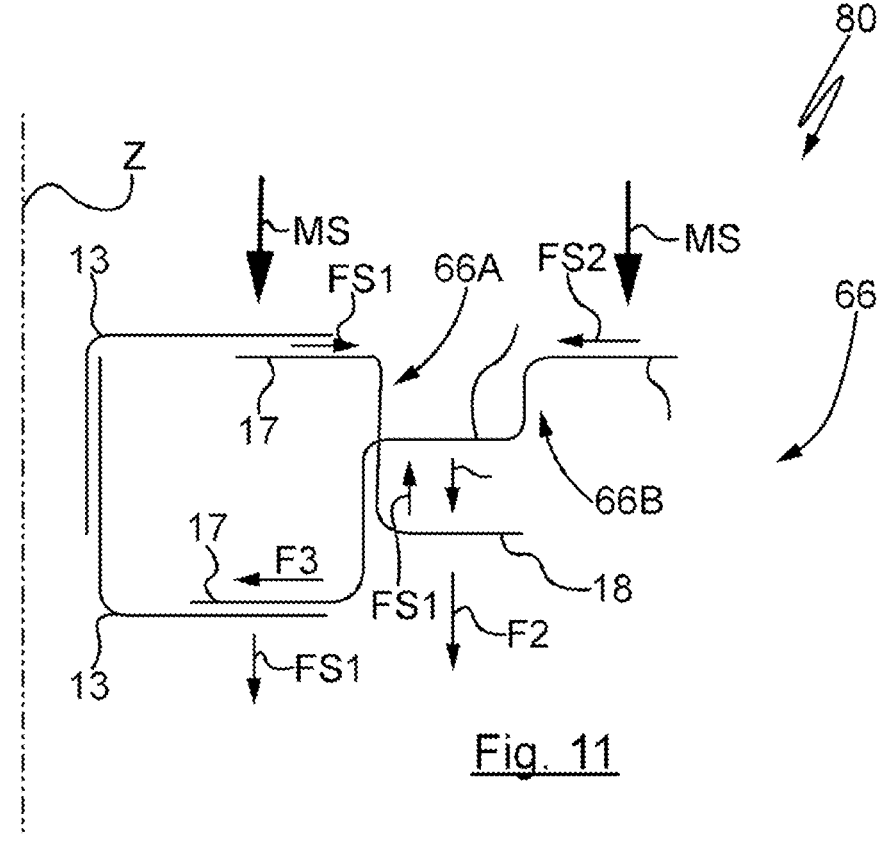

The invention will now be discussed in more detail on the basis of several preferred exemplary embodiments and with reference to the appended drawings, with functionally identical components being denoted by the same reference designations. In the drawings, in each case schematically:

FIG. 1 is a perspective illustration of a torque sensor device of the generic type known from the prior art, but without an associated magnetic sensor arrangement, FIG. 2 shows the torque sensor device from FIG. 1 during operation under the influence of a magnetic interference field surrounding the torque sensor device, FIG. 3 shows a detail of a first exemplary embodiment of a torque sensor device according to the invention in a side view, with a first exemplary embodiment of a flux guide arrangement according to the invention with two flux guides according to the invention in a schematic illustration, likewise without an associated magnetic sensor arrangement, FIG. 4a shows a detail of a second exemplary embodiment of a torque sensor device according to the invention in a perspective illustration, with a further exemplary embodiment of a flux guide arrangement according to the invention with two exemplary alternative flux guides according to the invention, likewise without an associated magnetic sensor arrangement, FIG. 4b shows the second flux guide of the flux guide arrangement according to the invention from FIG. 4a in a perspective illustration, FIG. 5a shows a detail of a third exemplary embodiment of a torque sensor device according to the invention, with a further exemplary embodiment of a flux guide arrangement according to the invention with two exemplary further alternative flux guides according to the invention, in this case with two magnetic sensors of an associated magnetic sensor arrangement, FIG. 5b shows the second flux guide from FIG. 5a in a perspective component illustration, FIG. 6a shows a detail of a further exemplary embodiment of a torque sensor device according to the invention, with a further exemplary embodiment of a flux guide arrangement according to the invention with two flux guides in a further possible exemplary refinement according to the invention, FIG. 6b shows the first flux guide from FIG. 6a in a perspective component illustration in a first view, FIG. 6c shows the first flux guide from FIGS. 6a and 6b in a perspective component illustration in a different view, FIG. 7a shows a further exemplary embodiment of a torque sensor device according to the invention without a corresponding magnetic sensor arrangement in a perspective illustration, with a further exemplary embodiment of a flux guide arrangement according to the invention with two flux guides each configured in accordance with the invention in a further possible refinement, FIG. 7b shows the first flux guide according to the invention from FIG. 7a in a perspective component illustration, FIG. 7c shows a second part of the first flux guide from FIGS. 7a and 7b in a perspective component illustration, FIG. 7d shows a first part of the first flux guide according to the invention from FIGS. 7a and 7b in a perspective component illustration, FIG. 8a shows a detail of a further exemplary embodiment of a torque sensor device according to the invention in a perspective illustration, with a further exemplary embodiment of a flux guide arrangement according to the invention with two flux guides each configured in accordance with the invention in a further refinement, and with 3 magnetic sensors, fastened to a common printed circuit board, of an associated magnetic sensor arrangement, FIG. 8b shows the torque sensor device from FIG. 8a in a different perspective illustration, FIG. 8c shows the torque sensor device from FIGS. 8a and 8b only with the first flux guide of the flux guide arrangement according to the invention, FIG. 8d shows the printed circuit board from FIGS. 8a to 8c with the two magnetic sensors fastened thereon in a perspective component illustration obliquely from below, FIG. 9a shows a further exemplary embodiment of a flux guide arrangement according to the invention, with two flux guides according to the invention and an interposed printed circuit board, which has two magnetic sensors of an associated magnetic sensor arrangement arranged thereon, for a torque sensor device according to the invention in a perspective illustration, FIG. 9b shows the flux guide arrangement from FIG. 9a in a different perspective view, FIG. 9c shows the first flux guide from FIGS. 9a to 9b and the printed circuit board with the two magnetic sensors fastened thereon in a perspective illustration obliquely from below, FIG. 10 shows a further exemplary embodiment of a torque sensor device according to the invention, with a further exemplary embodiment of a flux guide arrangement according to the invention with in each case two flux guides configured in accordance with the invention in a further refinement, likewise without an associated magnetic sensor arrangement, and FIG. 11 shows a detail of a further exemplary embodiment of a torque sensor device according to the invention in a diagrammatic illustration, with a further exemplary embodiment of a flux guide arrangement according to the invention, but in this case only with in each case one flux guide configured in accordance with the invention in a further refinement, likewise without an associated magnetic sensor arrangement.

FIG. 1 is a perspective illustration of a torque sensor device 1 of the generic type known from the prior art, but without an associated magnetic sensor arrangement, for detecting a torque applied to a steering shaft of a motor vehicle, wherein the torque sensor device 1 has a magnetic arrangement 5, a stator arrangement 2 with a first stator 2A and with a second stator 2B, each with an annular-disk-shaped stator body 3 and with stator tabs 4, a flux guide arrangement 6 with a first flux guide 6A and with a second flux guide 6B, and a magnetic sensor arrangement (not illustrated here).

To generate at least one magnetic working field MN (cf. FIG. 2), the magnetic arrangement 5 has a magnetic element 5 in the form of an annular permanent magnet which is arranged concentrically with respect to a central axis Z and with respect to the stator arrangement 2 and which can be fastened on a first part of a steering shaft (not illustrated here) for rotation therewith, whereas the stator arrangement 2 can be connected to a second part of the steering shaft for rotation therewith, such that the stator arrangement 2 is twistable relative to the magnetic element 5 about the central axis Z, which in particular coincides with an axis of rotation of the steering shaft, in a circumferential direction U, whereby a magnetic flux can be generated in the stator arrangement 2, in particular in the first stator 2A and in the second stator 2B, in a manner dependent on which magnetic flux the torque applied to the steering shaft can be determined.

Such torque sensor devices are basically known from the prior art, for example from DE 10 2013 006 379 A1 or EP 1 269 133 B1, to which reference is hereby explicitly made for a more detailed description of the functional principle of such a torque sensor device 1.

To at least partially concentrate and to conduct the magnetic flux that is generated in the stator arrangement 2 to the magnetic sensor arrangement (not illustrated here) in order to generate a corresponding sensor signal for further evaluation for the determination of the torque, a flux guide arrangement 6 with a first flux guide 6A and a second flux guide 6B is provided, wherein the flux guides 6A and 6B each have a collection surface 7 and in this case each have two transmission surfaces 8. The magnetic flux that is generated in the stator arrangement 2 is in each case concentrated via the collection surfaces 7 and is in each case transmitted via the transmission surfaces 8 to the magnetic sensor arrangement, in this case in particular to each of a first magnetic sensor that can be arranged parallel to the transmission surfaces 8 and a second magnetic sensor that can be arranged parallel to the other transmission surface 8 and in a plane with the first magnetic sensor, wherein the transmission surfaces 18 each form an axial gap (not designated in any more detail here) in which in each case one magnetic sensor of the magnetic sensor arrangement can be arranged between the transmission surfaces 8.

FIG. 2 shows a torque sensor device 1 similar to the torque sensor device from FIG. 1 during operation under the influence of a magnetic interference field MS surrounding the torque sensor device 1, wherein, in this case, the magnetic arrangement 5, which generates the magnetic working field MN that is required for determining the torque, and the stator arrangement 2 are of identical configuration to those in the torque sensor device 1 from FIG. 1, but the flux guide arrangement 6 has a different geometry, wherein, in particular, the first flux guide 6A and the second flux guide 6B, in particular the collection surfaces 7 and the transmission surfaces 8 thereof, have a different geometry. The functional principle of the flux guide arrangement 6 is however the same, and does not differ from that in the torque sensor device 1 illustrated in FIG. 1.

If the stator arrangement 2 is rotated relative to the magnetic element 5 about the central axis Z during operation, a magnetic flux is generated in the two stators 2A and 2B of the stator arrangement 2 in a manner dependent on the magnetic working field MN that is generated by the magnetic element 5, which magnetic flux is in each case concentrated in the collection surfaces 7 of the two flux guides and guided into the associated transmission surfaces 8.

Here, if the torque sensor device 1 is surrounded by a magnetic interference field MS, for example by a magnetic interference field generated by the electric motor in an electric vehicle, a magnetic interference flux is also generated in the stator arrangement 2, or in particular in each of the first stator 2A and/or the second stator 2B, in a manner dependent on said magnetic interference field MS, which magnetic interference flux is also concentrated in the two flux guides 6A and 6B, in particular in the collection surfaces 7 thereof, and is likewise also guided to the transmission surfaces 8.

Depending on how the magnetic working field MN and the magnetic interference field MS are oriented, an associated flux direction of the magnetic flux that is generated and the stators 2A and 2B and in the flux guides 6A and 6B is in each case oriented accordingly. The individual magnetic fluxes F1 and F2 (with only F2 being illustrated in FIG. 2) from the transmission surfaces 8 of the first and second flux guides 6A and 6B are vectorially added together in the gap between the transmission surfaces to form a resulting magnetic flux that can be transmitted to a magnetic sensor arranged in the axial gap between the transmission surfaces 8, wherein, in this case, only the magnetic flux F2 that is concentrated and transmitted by the second flux guide 6B is illustrated, with an upward flux direction, as symbolized in FIG. 2 by the arrows.

Depending on how the magnetic working field MN and the magnetic interference field MS are oriented, the magnetic interference field MS in each case amplifies or attenuates the magnetic flux that is transmitted via the individual transmission surfaces 8 to an associated magnetic sensor arrangement for evaluation, whereby the sensor signal, and thus the torque that is to be determined, is influenced or falsified. That is to say, the torque signal is influenced or falsified to a greater or lesser extent depending on the magnitude and direction of the magnetic flux resulting from the magnetic interference field MS, because said torque signal is determined from the resulting magnetic flux in the gap and not only from the magnetic flux that is generated in a manner dependent on the magnetic working field MN.

In particular if the torque sensor device is used in an environment in which one or more magnetic interference fields MS are superposed on the magnetic working field MN of the magnetic arrangement with the magnetic element 5, for example in hybrid and/or electric vehicles with an electric motor, this leads to a falsification of the torque signal determined using the torque sensor device 1.

FIG. 3 shows a detail of a first exemplary embodiment of a torque sensor device 10 according to the invention in a side view, with a first exemplary embodiment of a flux guide arrangement 16 according to the invention with two flux guides 16A and 16B according to the invention, in particular a first flux guide 16A and a second flux guide 16B, in a schematic illustration, likewise without an associated magnetic sensor arrangement.

The torque sensor device 10 likewise has a stator arrangement 12, with a first stator 12A and with a second stator 12B, and a magnetic arrangement 15 with a permanent annular magnet 15 as a magnetic element, wherein the two stators 12A and 12B likewise have an annular-disk-shaped stator body 13 and respectively corresponding tabs 14 which are arranged in each case in a comb-like manner relative to one another in a circumferential direction and engage with one another in an offset manner in an axial direction, and the stator arrangement 12 is rotatable relative to the magnetic element 15 in a circumferential direction U about the central axis Z.

Here, the first flux guide 16A and the second flux guide 16B each have not only a first collection surface 17 and a respectively associated transmission surface 18 but also a second collection surface 19, wherein the first collection surface 17 of the first flux guide 16A is in this case configured to concentrate a first magnetic flux with a working flux component FN, which is dependent on the magnetic working field MN or on an applied torque, and a first interference flux component FS1, which is dependent on the magnetic interference field MS surrounding the torque sensor device 10, and to transmit same via the associated transmission surface 18 into the gap formed by the transmission surfaces 18.

In the presence of an external magnetic interference field MS with an orientation as illustrated in FIG. 3, a second magnetic interference flux FS2 is generated in the second flux guide 16B via the second collection surface 19, provided according to the invention, of the second flux guide 16B, which second magnetic interference flux FS2 is transmitted via a connecting portion 19A, which in this case extends parallel to the central axis Z, and via a part of the first collection surface 17 of the second flux guide 16B, into the transmission surface 18 of the second flux guide 16B and from there, as a second interference flux component FS2 of a second magnetic flux F2 that is concentrated by the second flux guide 16B, into the gap.

According to the invention, the first flux guide 16A and the second flux guide 16B are in each case configured and arranged relative to one another such that the first interference flux component FS1 of the first magnetic flux F1, which component is at least partially concentrated in the first collection surface 17 of the first flux guide 16A and transmitted via the at least one transmission surface 18 of the first flux guide 16A into the gap, and a second interference flux component FS2 of the second magnetic flux F2, which component is at least partially concentrated in the second collection surface 19 of the second flux guide 16B and transmitted via the transmission surface 18 of the second flux guide 16B into the gap, at least partially cancel one another out. In this way, the interference flux component FS1 of the first magnetic flux F1 can be reduced or even eliminated entirely, whereby it is possible to reduce or avoid undesired influencing, by the magnetic interference field, of the sensor signal that is generated by the torque sensor device 10.

Via the transmission surface 18 of the second flux guide 16B and the first collection surface 17 of the second flux guide 16B, the remaining proportion of the first magnetic flux F1, in particular the remaining working flux FN, can be guided (denoted here by F3) from the first flux guide 16A back into the stator arrangement.

By virtue of the fact that the first flux guide 16A likewise has a second collection surface 19, it is furthermore possible to avoid a situation in which a second interference flux component FS2, which is transmitted via the transmission surface 18 of the second flux guide into the gap and is guided from there via the transmission surface 18 into the first flux guide 16A, is coupled in via the first collection surface 17 of the first flux guide 16A, because the remaining second interference flux component FS2 can be returned (denoted here by F3) via the connecting portion 19A and the second collection surface 19 of the first flux guide 16A into the surroundings.

In order to transmit the second interference flux component FS2 into the gap such that the first interference flux component FS1 and the second interference flux component FS2 cancel one another out in the gap, it is the case in particular that the first and second collection surfaces 17 and 19 respectively and the transmission surfaces 18 of the first flux guide 16A and of the second flux guide 16B are in each case arranged and oriented relative to one another, and in each case magnetically conductively coupled to one another via associated connecting portions 18A and 19A respectively, in such a way that the first interference flux component FS1 and the second interference flux component FS2 are transmitted with opposing directions into the gap.

In the present case, this is achieved in particular by virtue of the second collection surfaces 19 being arranged in each case parallel to the first collection surfaces 17 of the respective flux guide 16A and 16B but in a plane parallel thereto, that is to say in each case so as to be offset in an axial direction with respect to the first collection surface 17, and in particular on a different side of the transmission surface 18 of the associated flux guide 16A or 16B respectively. Here, the first and second collection surfaces 17 and 19 respectively of the two flux guides 16A and 16B, and the transmission surfaces 18 thereof, all extend in each case substantially in the form of a plate or disk in a plane extending perpendicular to the central axis Z.

In this way, a second interference flux component F2 that is dependent on the magnetic interference field MS is generated in each case in the second flux guide 16B, which second interference flux component F2 has, in the gap, an opposite direction in relation to the first interference flux component FS1 that is generated in a manner dependent on the magnetic interference field MS. In this way, in the two flux guides 16A and 16B themselves, and in particular already before a transmission to an associated magnetic sensor arrangement takes place, and without the use of additional magnetic elements or the like, it is possible in each case to achieve a reduction, and if the flux guides are designed appropriately in a manner adapted to the magnetic interference field MS, at least partial compensation, and in some cases even complete compensation (depending on the intensity and orientation of the external magnetic interference field MS and the size of the collection surfaces 17 and 19, in particular depending on the proportions of the second collection surfaces 19 in relation to the first collection surfaces 17), of the first interference flux FS1 that is concentrated in the first collection surfaces 17 in a manner dependent on the magnetic interference field MS.

In order to avoid a situation in which, in the second collection surfaces 19, a magnetic flux is also generated in a manner dependent on the magnetic working field MN, and therefore a component of the magnetic flux that is generated and collected in the first collection surfaces 17 in a manner dependent on the magnetic working field MN is also compensated, the two collection surfaces 19 are in this exemplary embodiment situated outside the stator arrangement 12 in a radial direction, whereas the first collection surfaces 17, which have the task in particular of concentrating the magnetic flux that is generated in a manner dependent on the magnetic working field MN in the stator arrangement 12, are situated within the stator arrangement 12 in a radial direction, and in particular completely overlap said stator arrangement in a radial direction.

In this example, both the first flux guide 16A and the second flux guide 16B are arranged in each case within the stator arrangement in an axial direction, that is to say they do not project upward or downward beyond the stator arrangement in an axial direction. A particularly compact design in an axial direction can thus be achieved.

This is however possible in principle, wherein at least one second collection surface 19 may in this case preferably be arranged above or below the stator arrangement in an axial direction. Here, if the second collection surface 19 is arranged with an adequate spacing in an axial direction, in particular with a defined minimum spacing, to the stator arrangement 12, the second collection surface 19 may likewise be arranged within the stator arrangement 12 in a radial direction and at least completely or partially overlap said stator arrangement in a radial direction. In this way, a torque sensor device can be provided which, despite being less compact in an axial direction, is particularly compact in a radial direction.

Both the first collection surfaces 17 and the second collection surfaces 19 of the two flux guides 16A and 16B are in particular each in the form of segments of annular disks in the exemplary embodiment shown in FIG. 3.

For advantageous magnetic characteristics, both of the flux guides 16A and 16B in this exemplary embodiment are produced in each case from a magnetically soft material, and in particular formed as punched and bent parts, as is also generally known from the prior art.

In this case, a size of the second collection surfaces 19 is in particular in each case selected to be in each case approximately 1.5 times the area of the first collection surface 17 of the associated flux guide 16A or 16B respectively. However, the size of the second collection surface 19 of the first and/or second flux guide 16A, 16B may also be selected not in a manner dependent on the size of the first collection surface of the associated flux guide 16A, 16B but in a manner dependent on the size of the first collection surface 17 of the other flux guide 16B. In this way, with a correspondingly suitably selected size, it is possible to achieve particularly good, in particular almost complete, or complete, compensation of a first interference flux component FS1 that has arisen in a manner dependent on the magnetic interference field MS.

FIG. 4a shows a detail of a second exemplary embodiment of a torque sensor device 20 in a perspective illustration with a further exemplary embodiment of a flux guide arrangement 16 according to the invention with two exemplary, alternative flux guides 16A and 16B according to the invention, likewise without an associated magnetic sensor arrangement, wherein, in this exemplary embodiment, the first and second collection surfaces 17 and 19 are each magnetically conductively connected via a connecting portion 18A and 19A respectively, which extends in a circumferential direction and in an axial direction, to the transmission surface 18, and are in each case magnetically conductively connected to one another via the connecting portions 18A and 19A and the transmission surface 18. In this case, the size of the second collection surfaces 19 corresponds in each case approximately to the size of the area of the first collection surfaces 17.

FIG. 4b, which shows the second flux guide 16B of the flux guide arrangement according to the invention from FIG. 4a in a perspective illustration, particularly clearly shows the design of the first collection surface 17 and of the second collection surface 19 in the form of segments of annular disks. It is likewise possible to see the arrangement of the transmission surface 18 in a plane between the first collection surface 17 and the second collection surface 19, and the arrangement of the two collection surfaces 17 and 19 on different sides of the transmission surface 18 in an axial direction, and the fact that the first collection surface 17 and the second collection surface 19 extend in each case in parallel planes that are each perpendicular to the central axis Z.

FIG. 5a shows a detail of a third exemplary embodiment of a torque sensor device 30 according to the invention, with a further exemplary embodiment of a flux guide arrangement 16 according to the invention with two exemplary further alternative flux guides 16A and 16B according to the invention, in this case with two magnetic sensors 21 of an associated magnetic sensor arrangement. Here, in this exemplary embodiment, the two flux guides 16A and 16B are arranged in nested fashion one inside the other, in particular are arranged so as to engage with one another, or so as to be pushed one inside the other, in a circumferential direction U. By contrast to the example from FIGS. 4a and 4b, in this exemplary embodiment neither the first flux guide 16A nor the second flux guide 16B has a closed, single-part transmission surface 18, but two individual separate transmission surfaces 18 are provided in each case, wherein the transmission surfaces 18 of the first flux guide 16A are coupled in each case via corresponding connecting portions 18A to the second collection surface. By contrast, in the case of the second flux guide 16B, one of the two transmission surfaces 18, in this case the transmission surface 18 that is on the left in the illustration in FIG. 5a, is connected to the second collection surface 19, and the other, right-hand transmission surface 18 is connected to the first collection surface 17, both likewise via a respective associated connecting portion 18A.

Here, the two transmission surfaces 18 of the first flux guide 16A are arranged in each case opposite the transmission surfaces 18 of the second flux guide 16B, and with this form an axial gap (not designated in any more detail here) that is configured for the arrangement of the magnetic sensors 21 (merely schematically indicated here).

The collection surfaces 17 and 19 and the transmission surfaces 18 are likewise magnetically conductively coupled or connected to one another via corresponding connecting portions 18A and 19A, which are likewise of magnetically conductive form, such that, as a result, a magnetic flux can be transmitted via each of the transmission surfaces 18 to the respective magnetic sensors 21 for the determination of a torque that is applied to the respective torque sensor device 30.

FIG. 5b shows the second flux guide 16B from FIG. 5a in a perspective component illustration, wherein this illustration particularly clearly shows the individual connecting portions 18A and 19A and the parallel arrangement of the first and second collection surfaces 17 and 19 respectively and of the transmission surfaces 18.

The transmission surfaces 18 are in this case configured and arranged such that the associated magnetic sensors 21 can be arranged in a common plane and in particular on a common printed circuit board (not illustrated here), resulting in a particularly advantageous design of a torque sensor device 30 according to the invention.

FIG. 6a shows a detail of a further exemplary embodiment of a torque sensor device 40 according to the invention with a further exemplary embodiment of a flux guide arrangement 16 according to the invention with two flux guides 16A and 16B in a further possible exemplary refinement according to the invention, wherein, in this exemplary embodiment of a torque sensor device 40 according to the invention, the two flux guides 16A and 16B are likewise of single-part form but, by contrast to the exemplary embodiment described on the basis of FIGS. 5a and 5b, said flux guides are configured as identical parts, which are merely turned through 180° relative to one another. This results in a torque sensor device 40 which is particularly easy to produce and which can be provided inexpensively.

FIG. 6b shows the first flux guide from FIG. 6a in a perspective component illustration in a first view, and FIG. 6c shows the first flux guide from FIGS. 6a and 6b in a perspective component illustration in a different view, wherein the individual functional surfaces 17, 19 and 18 and the connecting portions 18A, 19A and their design and arrangement relative to one another can be clearly seen from this illustration.

FIG. 7a shows a further exemplary embodiment of a torque sensor device 50 according to the invention with a further exemplary embodiment of a flux guide arrangement 26 according to the invention with two flux guides 26A and 26B each designed according to the invention in a further possible refinement, wherein this exemplary embodiment of a torque sensor device 50 according to the invention has a flux guide arrangement 26 according to the invention with a first flux guide 26A that is formed in two parts and a second flux guide 26B that is formed in two parts.

Here, the two flux guides 26A and 26B are each assembled from a first flux guide part 27 and a second flux guide part 28, which are each produced as punched and bent parts from a magnetically soft material. FIGS. 7b to 7d show the details of the flux guide 26A, wherein FIG. 7b shows the assembled flux guide 26A from FIG. 7a in a perspective component illustration, FIG. 7c shows the second part 28 in a perspective component illustration, and FIG. 7d shows the first part 27.

Here, the second flux guide part 28 comprises in each case the first collection surface 17 and the transmission surfaces 18, and the first flux guide part 27 comprises in each case the second collection surface 19. For the magnetic coupling of the second collection surface 19 to the first collection surface 17 in the assembled state, the first part 27 has a connecting portion 19A and a coupling surface (not designated in any more detail here), which can be arranged directly adjacent to the first collection surface 17, in particular so as to overlap or be congruent with the first collection surface 17, and in particular so as to make contact with said first collection surface 17 over a large area, and thus in magnetically and electrically conductive fashion.

A multi-part flux guide of said type allows a modular construction of a flux guide according to the invention, and thus a particularly flexible adaptation to the conditions of use, in particular a particularly flexible adaptation of the design of the second collection surface in accordance with requirements. In this way, it is for example possible in particular to adapt a size of the second collection surface in accordance with requirements. In this way, for different applications, it is possible to achieve a particularly good reduction or particularly good compensation of an interference flux that is generated, and thus consequently to provide a torque sensor device that is particularly robust with respect to magnetic interference fields.

FIG. 8a shows a detail of a further exemplary embodiment of a torque sensor device 60 according to the invention in a perspective illustration, having a further exemplary embodiment of a flux guide arrangement 36 according to the invention with two flux guides 36A and 36B each configured in accordance with the invention in a further refinement and with two magnetic sensors 21, fastened to a common printed circuit board 22, of an associated magnetic sensor arrangement, wherein the flux guides 36A and 36B are in this case likewise of single-part form but have a design that differs once again from the flux guides described above.

Here, the two magnetic sensors 21 are each configured as 2D Hall magnetic sensors and are arranged on a common printed circuit board 22 in a common plane and in each case in an axial gap between the transmission surfaces 18 of the first flux guide 36A and of the second flux guide 36B.

For a particularly compact design in an axial direction, in particular a particularly small structural height of the torque sensor device 60 in an axial direction, the printed circuit board 22 has a reduced thickness in a region 24 around the two magnetic sensors 21, which reduced thickness is realized in particular by way of a cutout 23 on the underside of the printed circuit board 22, as can be clearly seen in particular from FIGS. 8b to 8d.

Here, FIG. 8b shows the torque sensor device 60 from FIG. 8a in another perspective illustration, FIG. 8c shows the torque sensor device 60 with only the first flux guide 36A, and FIG. 8d shows the printed circuit board 22, with the two magnetic sensors 21 fastened thereto, in a perspective component illustration obliquely from below.

FIG. 9a shows a further exemplary embodiment of a flux guide arrangement 46 according to the invention, with two flux guides 46A and 46B according to the invention and an interposed printed circuit board 22, which has two magnetic sensors 21 of an associated magnetic sensor arrangement arranged thereon, for a torque sensor device according to the invention in a perspective illustration. FIG. 9b shows the flux guide arrangement 46 in a different perspective view. In this exemplary embodiment, for a compact design in an axial direction and by contrast to the exemplary embodiment described above on the basis of FIGS. 8a and 8d, the printed circuit board 22 does not have one large cutout 23 on its bottom side but has in each case two individual cutouts 23 or grooves 23 or recesses 23, into which the transmission surfaces 18 of the second, in this case lower, flux guide 46B project in each case from below. The cutouts 23 in the printed circuit board 22 can be seen particularly clearly from FIG. 9c, which shows the first flux guide 46A from FIGS. 9a and 9b and the printed circuit board 22, with the two magnetic sensors 21 fastened thereto, in a perspective illustration obliquely from below.

FIG. 10 shows a further exemplary embodiment of a torque sensor device 70 according to the invention with a further exemplary embodiment of a flux guide arrangement 56 according to the invention with in each case two flux guides 56A and 56B in a further refinement, likewise without an associated magnetic sensor arrangement, wherein, in this exemplary embodiment, by contrast to the exemplary embodiments of a flux guide arrangement 56 according to the invention described above, neither the first flux guide 56A nor the second flux guide 56B have second collection surfaces 19 in the form of segments of annular disks, but said first flux guide and second flux guide each have rectangular or in particular square collection surfaces 19, which is also possible in principle. However, in this exemplary embodiment, too, the size of each of the second collection surfaces 19 is in particular selected so as to achieve adequate compensation of the magnetic flux, which is generated in a manner dependent on a magnetic interference field MS, within the flux guide arrangement 56 or in particular in the individual flux guides 56A and 56B.

FIG. 11 shows a detail of a further exemplary embodiment of a torque sensor device 80 according to the invention in a diagrammatic illustration, with a further exemplary embodiment of a flux guide arrangement 66 according to the invention, but in this case only with in each case one second flux guide 66B configured in accordance with the invention with a second collection surface 19, likewise without an associated magnetic sensor arrangement. The first flux guide 66A has only a first collection surface 17, but no second collection surface.

By means of the refinement of the second flux guide 66B shown in FIG. 11, with a plane which lies in a plane perpendicular to the central axis Z and which extends in an axial direction between the collection surfaces 17 and 19 of the second flux guide 66B, and with the arrangement of the two flux guides 66A and 66B relative to one another as shown in FIG. 11, with the transmission surface 18 of the first flux guide 66A below the transmission surface of the second flux guide 66B, such a flux guide arrangement 66 also makes it possible to achieve that, if the torque sensor device 80 is surrounded by a correspondingly oriented magnetic interference field MS, a first interference flux component FS1 of the first magnetic flux F1, which component is at least partially concentrated in the first collection surface 17 of the first flux guide 66A and transmitted via the at least one transmission surface 18 of the first flux guide 66A, and a second interference flux component FS2 of the second magnetic flux F2, which component is at least partially concentrated in the second collection surface 19 of the second flux guide 66B and transmitted via the at least one transmission surface 18 of the second flux guide 66B, at least partially cancel one another out.

A large number of modifications, in particular in terms of design, are self-evidently also possible without departing from the scope of protection of the patent claims.

LIST OF REFERENCE SIGNS

1 Torque sensor device, known from the prior art
2 Stator arrangement
2A First stator
2B Second stator
3 Annular-disk-shaped stator body
4 Stator tab
5 Magnetic element
6 Flux guide arrangement, known from the prior art
6A First flux guide, known from the prior art
6B Second flux guide, known from the prior art
7 Collection surface
8 Transmission surface
10, 20, 30, 40, 50, 60, Torque sensor device according to the invention
70, 80

12 Stator arrangement
12A First stator
12B Second stator
13 Annular-disk-shaped stator body
14 Stator tab
15 Magnetic element
16, 26, 36, 46, 56, 66 Flux guide arrangement according to the invention
16A, 26A, 36A, 46A, First flux guide according to the invention
56A, 66A
16B, 26B, 36B, 46B, Second flux guide according to the invention
56B, 66B
17 First collection surface
18 Transmission surface
19 Second collection surface
18A Connecting portion
19A Connecting portion
21 Magnetic sensor
22 Printed circuit board
23 Cutout, groove
24 Region of reduced thickness
27 First part of the flux guide
28 Second part of the flux guide
F1 First magnetic flux
F2 Second magnetic flux
F3 Component of the first magnetic flux that is transmitted back into the stator arrangement
F4 Component of the second magnetic flux that is transmitted back into the surroundings
FN Magnetic working flux
FS1 First magnetic interference flux
FS2 Second magnetic interference flux
MN Magnetic working field
MS Magnetic interference field
U Circumferential direction
Z Central axis.

The invention claimed is:

1. A torque sensor device for detecting a torque applied to a steering shaft of a motor vehicle, comprising:
a magnetic arrangement;
a stator arrangement; and
a flux guide arrangement,
wherein the magnetic arrangement is configured to generate at least one magnetic working field, and the magnetic arrangement and the stator arrangement are movable relative to one another in a circumferential direction about a central axis of the torque sensor device as a result of a torque being applied, in such a way that the relative movement between the magnetic arrangement and the stator arrangement in a circumferential direction enables a magnetic working flux to be generated in the stator arrangement in a manner dependent on the torque applied to the torque sensor device,
wherein a first magnetic interference flux (FS1) generated in the stator arrangement in a manner dependent on a magnetic interference field surrounding the torque sensor device,
wherein the flux guide arrangement has a first flux guide, and a second flux guide, and the first flux guide and the second flux guide each have a first collection surface and each have at least one transmission surface,
wherein the first collection surfaces are each configured to at least partially concentrate and/or to at least partially conduct a magnetic working flux, which is generated in the stator arrangement in a manner dependent on an applied torque, and/or a first magnetic interference flux (FS1), which is generated in a manner dependent on a magnetic interference field (FS) surrounding the torque sensor device, wherein the at least one transmission surface of the first flux guide and the at least one transmission surface of the second flux guide are arranged opposite one another so as to between them form axial gap in which at least one magnetic sensor of a magnetic sensor arrangement can be arranged, wherein a first magnetic flux (F1) that is concentrated in the first flux guide is transmitted via the at least one transmission surface of the first flux guide to a magnetic sensor, arranged in the axial gap, of a magnetic sensor arrangement, and wherein a second magnetic flux (F2) that is concentrated in the second flux guide is transmitted via the at least one transmission surface of the second flux guide to the magnetic sensor, wherein the second flux guide furthermore has a second collection surface which is magnetically conductively coupled to the at least one transmission surface of the second flux guide and which is configured to generate and/or to at least partially concentrate and/or conduct a second magnetic interference flux (FS2) in a manner dependent on a magnetic interference field (MS) surrounding the torque sensor device, wherein the first flux guide and the second flux guide are each configured and arranged relative to one another such that, if the torque sensor device is surrounded by a magnetic interference field (MS), a first interference flux component (FS1) of the first magnetic flux (F1), which component is at least partially concentrated in the first collection surface of the first flux guide and transmitted via the at least one transmission surface of the first flux guide to the magnetic sensor, and a second interference flux component (FS2) of the second magnetic flux (F2), which component is at least partially concentrated in the second collection surface of the second flux guide and transmitted via the at least one transmission surface of the second flux guide to the magnetic sensor, at least partially cancel one another out, wherein the flux guide arrangement is arranged within the stator arrangement in an axial direction, wherein the second collection surface of at least one flux guide extends further outward in a radial direction than the first collection surface of the associated flux guide and/or is arranged further to the outside in a radial direction than the first collection surface of the associated flux guide.

2. The torque sensor device as claimed in claim 1, wherein the first flux guide furthermore likewise has a second collection surface, wherein the second collection surface of the first flux guide is magnetically conductively coupled to the at least one transmission surface of the first flux guide and is likewise configured to generate and/or to at least partially concentrate and conduct a second magnetic interference field (FS2) in a manner dependent on a magnetic interference field (MS) surrounding the torque sensor device, wherein the first flux guide and the second flux guide are each configured and arranged relative to one another such that, if the torque sensor device is surrounded by a magnetic interference field (MS), a first interference flux component (FS1) of the second magnetic flux (F2), which component is at least partially concentrated in the first collection surface of the second flux guide and transmitted via the at least one transmission surface of the second flux guide to the magnetic sensor, and a second interference flux component (FS2) of the first magnetic flux (F1), which component is at least partially concentrated in the second collection surface of the first flux guide and transmitted via the at least one transmission surface of the first flux guide to the magnetic sensor, at least partially cancel one another out.

3. The torque sensor device as claimed in claim 1, wherein the first collection surface and/or the second collection surface and/or at least one transmission surface of at least one flux guide extends at least partially in a plane that runs perpendicular to the central axis of the torque sensor device.

4. The torque sensor device as claimed in claim 1, wherein the second collection surface of at least one flux guide extends at least partially parallel to the first collection surface of the associated flux guide.

5. The torque sensor device as claimed in claim 1, wherein at least one transmission surface of at least one flux guide extends at least partially in a plane which, in relation to a direction along the central axis, runs between the first collection surface and the second collection surface of the associated flux guide.

6. The torque sensor device as claimed in claim 1, wherein the first collection surface of at least one flux guide is arranged at least partially overlapping the stator arrangement in a radial direction.

7. The torque sensor device as claimed in claim 1, wherein the second collection surface of at least one flux guide is arranged within the stator arrangement at least partially laterally adjacent to the stator arrangement, at a level along the central axis in an axial direction.

8. The torque sensor device as claimed in claim 1, wherein the second collection surface of at least one flux guide is arranged above or below the stator arrangement in an axial direction along the central axis.

9. The torque sensor device as claimed in claim 1, wherein a size of the second collection surface of at least one flux guide is selected such that a second magnetic interference flux (FS2) which is generated by a defined magnetic interference field (MS) surrounding the torque sensor device and with a defined field direction and which is focused by the second collection surface is of such a magnitude that a defined a component of at least 25%, 50% or 75% of the first interference flux (FS1) generated by the magnetic interference field (MS), is compensated.

10. The torque sensor device as claimed in claim 1, wherein the second collection surface of at least one flux guide is at least as large as the first collection surface of the associated flux guide is approximately or exactly the same size as or is at least 1.3 times, 1.5 times, 2 times, 2.5 times or 3 times but at most 4 times the size of, the first collection surface.

11. The torque sensor device as claimed in claim 1, wherein the first collection surface and the second collection surface of at least one flux guide are connected to one another in each case by a connecting portion extending at least partially parallel to the central axis.

12. A flux guide arrangement for a torque sensor device configured as claimed in claim 1, wherein the flux guide arrangement comprises:

at least one first flux guide and one second flux guide, and the first flux guide and the second flux guide each have a first collection surface and each have at least one transmission surface, wherein the first collection surfaces are each configured to at least partially concentrate and/or to at least partially conduct a magnetic working flux (FN), which is generated in the stator arrangement of a torque sensor device in a manner dependent on an applied torque, and/or a first magnetic interference flux (FS1), which is generated in a manner dependent on a magnetic interference field (FS) surrounding the torque sensor device, wherein the at least one transmission surface of the first flux guide and the at least one transmission surface of the second flux guide are arranged opposite one another so as to between them form axial gap in which at least one magnetic sensor of a magnetic sensor arrangement can be arranged, wherein a first magnetic flux (F1) that is concentrated in the first flux guide can be is transmitted via the at least one transmission surface of the first flux guide to a magnetic sensor, arranged in the axial gap, of a magnetic sensor arrangement, and wherein a second magnetic flux (F2) that is concentrated in the second flux guide transmitted via the at least one transmission surface of the second flux guide to the magnetic sensor, wherein the second flux guide furthermore has a second collection surface which is magnetically conductively coupled to the at least one transmission surface of the second flux guide and which is configured to generate and/or to at least partially concentrate and conduct a second magnetic interference flux (FS2) in a manner dependent on a magnetic interference field (MS) surrounding the torque sensor device, wherein the first flux guide and the second flux guide are each configured and arranged relative to one another such that, if the torque sensor device is surrounded by a magnetic interference field (MS), a first interference flux component (FS1) of the first magnetic flux (F1), which component is at least partially concentrated in the first collection surface of the first flux guide and transmitted via the at least one transmission surface of the first flux guide to the magnetic sensor, and a second interference flux component (FS2) of the second magnetic flux (F2), which component is at least partially concentrated in the second collection surface of the second flux guide and transmitted via the at least one transmission surface of the second flux guide to the magnetic sensor, at least partially cancel one another out.

13. The flux guide arrangement as claimed in claim 12, wherein the first flux guide furthermore likewise has a second collection surface, wherein the second collection surface of the first flux guide is magnetically conductively coupled to the at least one transmission surface of the first flux guide and is likewise configured to generate and/or to at least partially concentrate and conduct a second magnetic interference field (FS2) in a manner dependent on a magnetic interference field (MS) surrounding a torque sensor device, wherein the first flux guide and the second flux guide are each configured and arranged relative to one another such that, if the torque sensor device is surrounded by a magnetic interference field (MS), a first interference flux component (FS1) of the second magnetic flux (F1), which component is at least partially concentrated in the first collection surface of the second flux guide and transmitted via the at least one transmission surface of the second flux guide to the magnetic sensor, and a second interference flux component (FS2) of the first magnetic flux (F2), which component is at least partially concentrated in the second collection surface of the first flux guide and transmitted via the at least one transmission surface of the first flux guide to the magnetic sensor, at least partially cancel one another out.

14. A flux guide for the flux guide arrangement as claimed in claim 12 for a torque sensor device, wherein the flux guide is configured for use in the flux guide arrangement and has a first collection surface and at least one transmission surface, wherein the first collection surface is configured to at least partially concentrate and/or to at least partially conduct a magnetic working flux (FN), which is generated in the stator arrangement of a torque sensor device in a manner dependent on an applied torque, and/or a first magnetic interference flux (FS1), which is generated in a manner dependent on a magnetic interference field (MS) surrounding the torque sensor device, wherein a magnetic flux that is concentrated in the flux guide is transmitted via the at least one transmission surface of the flux guide to an adjacently arranged magnetic sensor of a magnetic sensor arrangement, wherein the flux guide has a second collection surface which is magnetically conductively coupled to the at least one transmission surface of the flux guide and which, in a functional state of use of the flux guide in a torque sensor device, is configured to generate and/or to at least partially concentrate and conduct a second magnetic interference flux (FS2) in a manner dependent on a magnetic interference field (MS) surrounding the torque sensor device, wherein the flux guide is configured to be arranged together with another flux guide for the flux guide arrangement such that, if the torque sensor device is surrounded by a magnetic interference field (MS), a first interference flux component (FS1), which is at least partially concentrated in the first collection surface of the other flux guide and transmitted via the at least one transmission surface (18) of the other flux guide, and a second interference flux component (FS2), which is at least partially concentrated in the second collection surface of the flux guide and transmitted via the at least one transmission surface of the flux guide, at least partially cancel one another out.

* * * * *